United States Patent
Mailhot et al.

(10) Patent No.: US 10,442,264 B2
(45) Date of Patent: Oct. 15, 2019

(54) VEHICLE SUSPENSION ASSEMBLY

(71) Applicant: BOMBARDIER RECREATIONAL PRODUCTS INC., Valcourt (CA)

(72) Inventors: Philippe Mailhot, Granby (CA); Pascal Jacques, Valcourt (CA); Bruno Larocque, St-Pie (CA); Jeremie Duford, Sherbrooke (CA)

(73) Assignee: BOMBARDIER RECREATIONAL PRODUCTS INC., Valcourt (CA)

( * ) Notice: Subject to any disclaimer, the term of this patent is extended or adjusted under 35 U.S.C. 154(b) by 78 days.

(21) Appl. No.: 15/746,253

(22) PCT Filed: Sep. 18, 2015

(86) PCT No.: PCT/IB2015/057214
§ 371 (c)(1),
(2) Date: Jan. 19, 2018

(87) PCT Pub. No.: WO2017/017506
PCT Pub. Date: Feb. 2, 2017

(65) Prior Publication Data
US 2018/0215223 A1    Aug. 2, 2018

Related U.S. Application Data

(60) Provisional application No. 62/198,946, filed on Jul. 30, 2015.

(51) Int. Cl.
*B60G 3/20*        (2006.01)
*B60G 7/02*        (2006.01)
(Continued)

(52) U.S. Cl.
CPC .................. *B60G 7/02* (2013.01); *B60G 3/20* (2013.01); *B60G 7/001* (2013.01); *B60G 7/008* (2013.01);
(Continued)

(58) Field of Classification Search
CPC .... B60G 7/02; B60G 3/20; B60G 2204/1224; B60G 2204/143
See application file for complete search history.

(56) References Cited

U.S. PATENT DOCUMENTS

| 7,322,591 B2 * | 1/2008 | Seki | B60G 3/20 |
| | | | 280/124.106 |
| 8,454,041 B2 * | 6/2013 | Fujii | B60G 3/20 |
| | | | 280/124.125 |

(Continued)

FOREIGN PATENT DOCUMENTS

| RU | 2009146554 A | 6/2011 |
| RU | 2010105993 A | 8/2011 |
| WO | 20150114606 A1 | 8/2015 |

OTHER PUBLICATIONS

Search Report received from the Russian Patent Office in connection with correponding Patent Application No. 2018107100, dated Apr. 17, 2019.

(Continued)

*Primary Examiner* — Nicole T Verley
(74) *Attorney, Agent, or Firm* — BCF LLP

(57) ABSTRACT

A vehicle has a frame and left and right suspension assemblies connected to the frame. Each suspension assembly has a suspension support connected to the frame; a lower control arm having an inner end pivotally connected to the suspension support at two longitudinally spaced positions; an upper control arm having an inner end pivotally connected 5 to the suspension support at two longitudinally spaces positions; a knuckle pivotally connected to outer ends of the lower and outer control arms; and a shock absorber having an upper end pivotally connected to the suspension support and a lower end pivotally connected to one of the lower and upper control arms. A sway bar has ends connected to two of the control arms and is pivotally connected to the suspension supports. Wheels are rotationally 10 connected to the knuckles.

16 Claims, 15 Drawing Sheets

(51) Int. Cl.
*B60G 7/00* (2006.01)
*B60G 21/055* (2006.01)
*B60G 15/06* (2006.01)

(52) U.S. Cl.
CPC ......... *B60G 15/067* (2013.01); *B60G 21/055* (2013.01); *B60G 21/0551* (2013.01); *B60G 2200/144* (2013.01); *B60G 2204/1224* (2013.01); *B60G 2204/143* (2013.01); *B60G 2204/148* (2013.01); *B60G 2204/4302* (2013.01); *B60G 2204/82* (2013.01); *B60G 2204/8302* (2013.01); *B60G 2206/11* (2013.01); *B60G 2300/07* (2013.01); *B60G 2300/124* (2013.01); *B60G 2300/13* (2013.01)

(56) References Cited

U.S. PATENT DOCUMENTS 9,776,466 B2 * 10/2017 Battaglia .................. B60G 3/18
2001/0048207 A1 12/2001 Handa
2005/0253353 A1 11/2005 Yamamura et al.
2007/0176386 A1 8/2007 Schlangen et al.
2007/0176387 A1 8/2007 Tsuruta et al.
2008/0023249 A1 1/2008 Sunsdahl et al.
2012/0217078 A1 8/2012 Kinsman
2012/0256388 A1 * 10/2012 Swist ...................... B60G 3/06
280/124.136

OTHER PUBLICATIONS

English abstract of RU2010105993A retrieved from https://worldwide.espacenet.com/ on May 8, 2019.
English abstract of RU2009146554A retrieved from https://worldwide.espacenet.com/ on May 8, 2019.
International Search Report of PCT/IB2015/057214; Blaine Copenheaver; dated Dec. 28, 2015.
Bombardier Recreational Products Inc., 2013 Shop Manual, 2012, Cover pages and pp. 597-607.

* cited by examiner

VEHICLE SUSPENSION ASSEMBLY

CROSS-REFERENCE

The present application claims priority to U.S. Provisional Patent Application No. 62/198,946, filed Jul. 30, 2015, the entirety of which is incorporated herein by reference.

FIELD OF TECHNOLOGY

The present technology relates to vehicle suspension assemblies.

BACKGROUND

Many vehicles are provided with double wishbone suspensions to connect the wheels to the frame of the vehicle. This type of suspension has two wishbone-shaped arm, hence the name of this type of suspension. The double wishbone suspension is sometimes referred to as a double A-arm suspension when the two arms are A-shaped. A generic name used to cover the various geometries of arms used in this type of suspension is control arm.

The above type of suspension has one upper control arm and one lower control arm disposed below the upper control arm. The upper control arm is pivotally connected at two positions to the frame of the vehicle and has an outer end pivotally connected to a top of a knuckle. The lower control arm is pivotally connected at two positions to the frame of the vehicle and has an outer end pivotally connected to a bottom of the knuckle. The knuckle is rotationally connected to the wheel. A shock absorber is typically connected between one of the control arms and the frame.

Each of the four positions where the control arms connect to the frame and the position where the shock absorber connects to the frame has a bracket or other mounting device formed by or connected to a frame member. As the various connection positions are located on different frame members, the assembly of the brackets to the frame members and the control arms to the brackets can be complex, requires precision and can therefore be time consuming. Also, the tolerances used when assembling the frame members, when manufacturing and mounting the brackets and when manufacturing the control arms have to be fairly tight in order to ensure the assembly of the control arms to the frame.

Some vehicles are also provided with a sway bar connected between two suspension assemblies to reduce vehicle roll. The sway bar also needs to be mounted to the frame.

Furthermore, many vehicles, such as off-road vehicles, have limited space available for the various components such as the suspension assemblies. However, the suspension assemblies still need to have sufficient movement to permit travel of the wheels relative to the frame while avoiding interference/impact between its various components over its full range of motion.

There is therefore a desire for a vehicle suspension assembly that addresses at least some of the above-noted deficiencies.

SUMMARY

It is an object of the present technology to ameliorate at least some of the inconveniences present in the prior art.

According to one aspect of the present technology, there is provided a vehicle having a frame, a left suspension assembly connected to the frame, and a right suspension assembly connected to the frame. Each of the left and right suspension assemblies has a suspension support connected to the frame; a lower control arm having an inner end pivotally connected to the suspension support at a first position and at a second position, the first and second positions being longitudinally spaced from each other; an upper control arm having an inner end pivotally connected to the suspension support at a third position and at a fourth position, the third and fourth positions being longitudinally spaced from each other; a knuckle pivotally connected to an outer end of the lower control arm and to an outer end of the upper control arm; and a shock absorber having an upper end pivotally connected to the suspension support and a lower end pivotally connected to one of the lower and upper control arms. The first and third positions are forward of a central axis of the shock absorber. The second and fourth positions are rearward of the central axis of the shock absorber. A sway bar has a left end and a right end. The left end of the sway bar is connected to one of the lower and upper control arms of the left suspension assembly. The right end of the sway bar being connected to one of the lower and upper control arms of the right suspension assembly. The sway bar is pivotally connected to the suspension supports of the left and right suspension assemblies. A left wheel rotationally connected to the knuckle of the left suspension assembly. A right wheel is rotationally connected to the knuckle of the right suspension assembly.

In some embodiments of the present technology, for each of the left and right suspension assemblies, the lower end of the shock absorber is pivotally connected to the lower control arm.

In some embodiments of the present technology, for each of the left and right suspension assemblies: the upper control arm has an upper front member and an upper rear member, the upper front member is connected to the upper rear member, an inner end of the upper front member is pivotally connected to the suspension support at the third position, and an inner end for the upper rear member is pivotally connected to the suspension support at the fourth position.

In some embodiments of the present technology, for each of the left and right suspension assemblies: the lower control arm has a lower front member and a lower rear member, the lower front member is connected to the lower rear member, an inner end of the lower front member is pivotally connected to the suspension support at the first position, and an inner end for the lower rear member is pivotally connected to the suspension support at the second position.

In some embodiments of the present technology, for each of the left and right suspension assemblies: the suspension support has a front arm and a rear arm, the inner ends of the upper and lower front members are pivotally connected to the front arm of the suspension support, and the inner ends of the upper and lower rear members are pivotally connected to the rear arm of the suspension support.

In some embodiments of the present technology, for each of the left and right suspension assemblies: the front arm of the suspension support is a lower front arm, the rear arm of the suspension support is a lower rear arm, the suspension support has an upper arm, and the upper end of the shock absorber is pivotally connected to the upper arm of the suspension support.

In some embodiments of the present technology, for each of the left and right suspension assemblies: the front arm of the suspension support is forward of the central axis of the shock absorber, and the rear arm of the suspension support is rearward of the central axis of the shock absorber.

In some embodiments of the present technology, for each of the left and right suspension assemblies: an outer end of the upper front member is pivotally connected to the knuckle at a position forward of the central axis of the shock absorber, and an outer end for the upper rear member is pivotally connected to the knuckle at a position forward of the central axis of the shock absorber.

In some embodiments of the present technology, for each of the left and right suspension assemblies: the upper rear member has a first portion and a second portion; the first portion of the upper rear member extends generally forwardly from the inner end of the upper rear member and is disposed laterally between the central axis of the shock absorber and the suspension support, the second portion of the upper rear member extends generally laterally between the first portion of the upper rear member and an outer end of the upper rear member, and the second portion of the upper rear member is disposed forward of the central axis of the shock absorber.

In some embodiments of the present technology, the left end of the sway bar is connected to the lower control arm of the left suspension assembly, and the right end of the sway bar is connected to the lower control arm of the right suspension assembly.

In some embodiments of the present technology, a left link connects the left end of the sway bar to the lower control arm of the left suspension assembly, and a right link connects the right end of the sway bar to the lower control arm of the right suspension assembly.

In some embodiments of the present technology, the upper control arm of the left suspension assembly has a portion disposed longitudinally between the left link and the central axis of the shock absorber of the left suspension assembly, and the upper control arm of the right suspension assembly has a portion disposed longitudinally between the right link and the central axis of the shock absorber of the right suspension assembly.

In some embodiments of the present technology, for each of the left and right suspension assemblies: the inner end of the lower control arm is pivotally connected to the suspension support about a first axis, the inner end of the upper control arm is pivotally connected to the suspension support about a second axis, the upper end of the shock absorber is pivotally connected to the suspension support about a third axis, the first axis is vertically lower than the second axis, and the second axis is vertically lower than the third axis.

In some embodiments of the present technology, the sway bar is pivotally connected to the suspension supports of the left and right suspension assemblies about a fourth axis. For each of the left and right suspension assemblies, the fourth axis is vertically between the second and third axes.

In some embodiments of the present technology, each of the left and right suspension assemblies also has a pillow block connected to the suspension support. The sway bar is supported by the pillow blocks of the left and right suspension assemblies.

In some embodiments of the present technology, the left and right ends of the sway bar are disposed forward of the central axes of the shock absorbers of the left and right suspension assemblies, and the pillow blocks of the left and right suspensions assemblies are disposed rearward of the central axes of the shock absorbers of the left and right suspension assemblies.

In some embodiments of the present technology, the left suspension assembly is a rear left suspension assembly, the right suspension assembly is a rear right suspension assembly, the left wheel is a rear left wheel, and the right wheel is a rear right wheel. The vehicle also has a front left suspension assembly connected to the frame, a front right suspension assembly connected to the frame, a front left wheel rotationally connected to the front left suspension assembly, and a front right wheel rotationally connected to the front right suspension assembly.

For purposes of the present application, terms related to spatial orientation such as forward, rearward, front, rear, upper, lower, left, and right, are as they would normally be understood by a driver of the vehicle sitting thereon in a normal driving position with the vehicle being upright and steered in a straight ahead direction. When terms related to spatial orientation are applied to individual components of the vehicle, such as a knuckle of a suspension system for example, these terms are as they would be understood by a driver of the vehicle sitting thereon in a normal driving position with the vehicle being upright and steered in a straight ahead direction with the individual component mounted to the vehicle. Should there be discrepancies between the definition of a term in the present application and the definition of this term in a document incorporated herein by reference, the definition of this term in the present application takes precedence.

Embodiments of the present technology each have at least one of the above-mentioned object and/or aspects, but do not necessarily have all of them. It should be understood that some aspects of the present technology that have resulted from attempting to attain the above-mentioned object may not satisfy this object and/or may satisfy other objects not specifically recited herein.

Additional and/or alternative features, aspects and advantages of embodiments of the present technology will become apparent from the following description, the accompanying drawings and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described herein with respect to a side-by-side vehicle 10. However, it is contemplated that aspects of the present technology could be used in suspension assemblies of other vehicles such as, but not limited to, all-terrain vehicles (ATVs).

Figure 1:
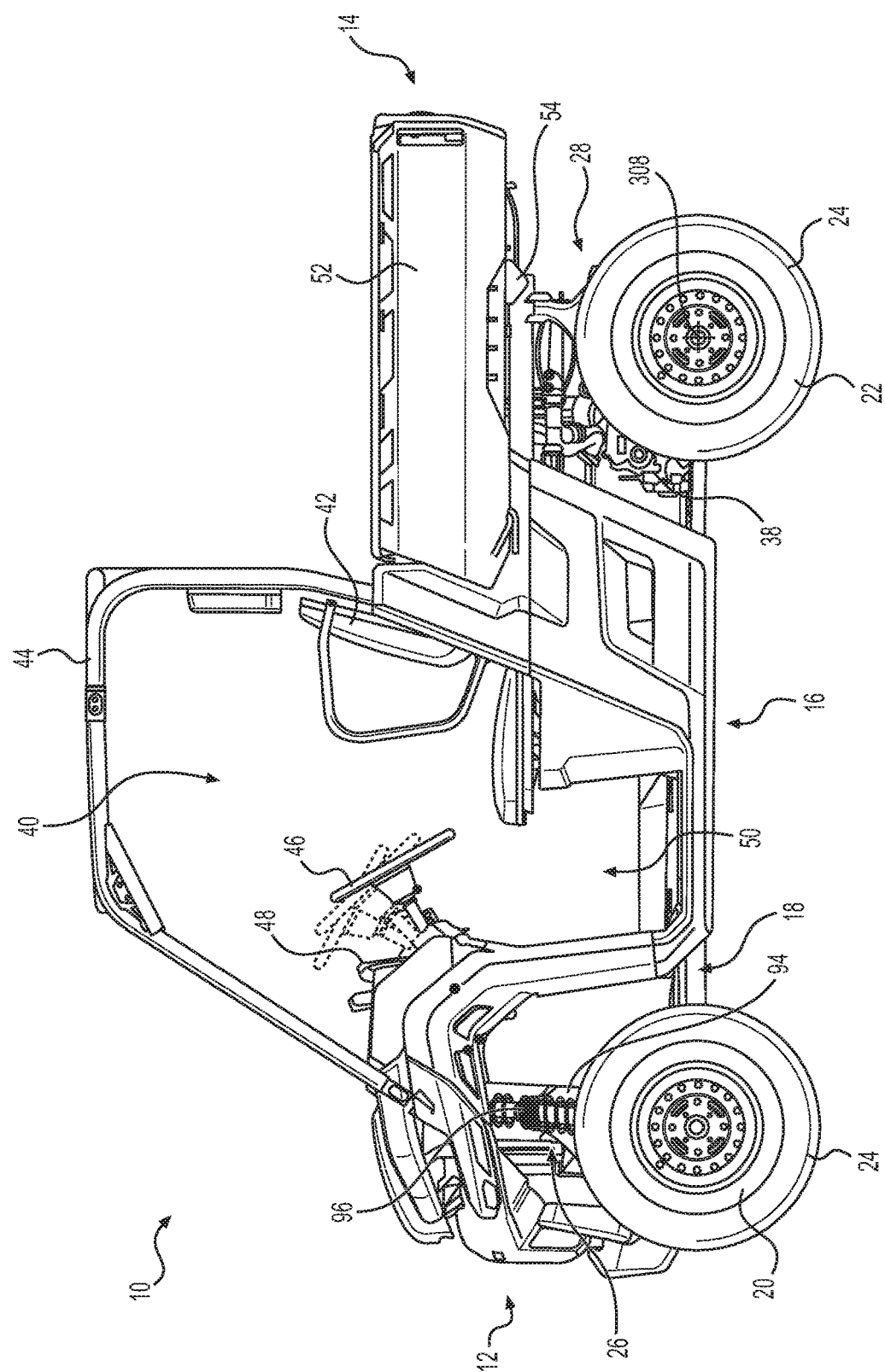
FIG. 1 is a left side elevation view of a side-by-side vehicle.

FIG. 1 illustrates the vehicle 10 having a front end 12, a rear end 14, and left and right sides 16 (only the left side 16 being shown), defined consistently with the forward travel direction of the vehicle 10. The vehicle 10 includes a frame 18 to which the other parts of the vehicle 10 are connected. The frame 18 has a front portion 18A, a rear portion 18B and a middle portion 18C (see FIG. 3) and will be described in more detail below.

The vehicle 10 includes a pair of front wheels 20 and a pair of rear wheels 22 (only the left wheels 20, 22 being shown). Each of the wheels 20, 22 has a tire 24. Each front wheel 20 is suspended from the front portion 18A of the frame 18 via a front suspension assembly 26. Each rear wheel 22 is suspended from the rear portion 18B of the frame 18 via a rear suspension assembly 28.

Figure 2:
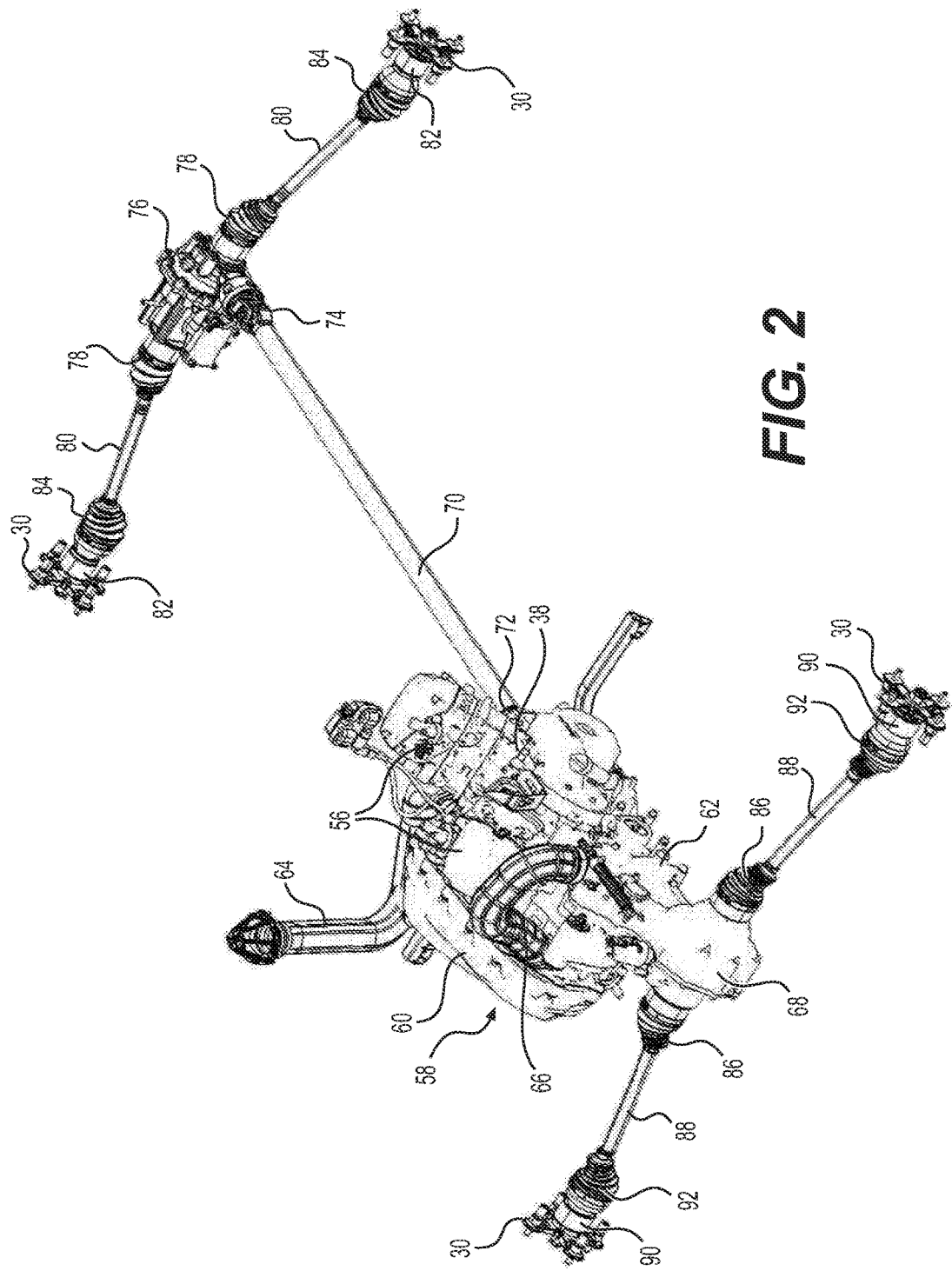
FIG. 2 is a perspective view taken from a rear, right side of a powertrain of the vehicle of FIG. 1.
Figure 5:
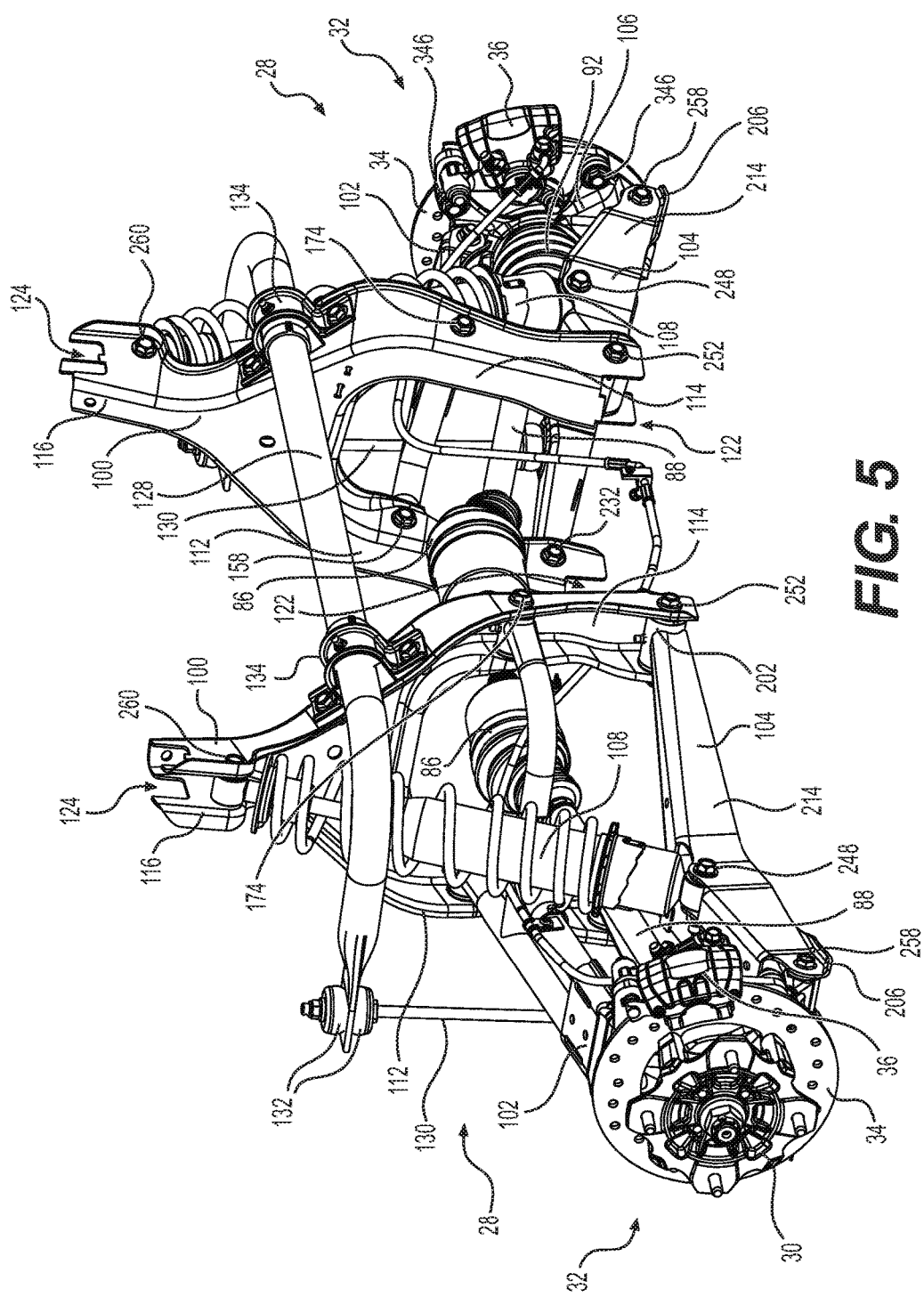
FIG. 5 is a perspective view taken from a rear, left side of the rear suspension assemblies of FIG. 3 and a portion of the powertrain of FIG. 2.

Each of the wheels 20, 22 is mounted to a hub 30 (see FIG. 2). Each of the wheels 20, 22 is provided with a brake 32 (FIG. 5, only the rear brakes 32 being shown). As can be seen in FIG. 5 for the rear brakes, each brake 32 has a brake disc 34 mounted to the hub 30 and a caliper 36 straddling the brake disc 34. Brake pads (not shown) are mounted to the caliper 36 so as to be disposed between the caliper 36 and the brake disc 34 on either side of the brake disc 34. The caliper 36 is hydraulically actuated by a hydraulic piston connected to a hydraulic cylinder (not shown) via brake lines (not shown). The hydraulic cylinder is connected to and actuated by a foot operated brake pedal (not shown) such that when the brake pedal is actuated, hydraulic pressure is applied to the hydraulic cylinder and thereby to the piston of the caliper 36, causing the brake pads to squeeze the brake disc 34 which, through friction, brakes the wheel 20 or 22. The calipers 36 of the front and rear brakes 32 are mounted to the front and rear suspension assemblies 26, 28 respectively. The connection of the calipers 36 of the rear brakes 32 to the rear suspension assemblies 28 will be described in more detail below. The front and rear wheels 20, 22 are connected to an engine 38 (FIG. 2) as will be described in greater detail below.

The vehicle 10 has an open-air cockpit area 40 disposed generally in the middle portion of the vehicle 10. The cockpit area 40 comprises a left seat 42 to accommodate a driver of the vehicle 10, and middle and right seats (not shown) to accommodate two passengers (collectively referred to herein as riders). It is contemplated that the vehicle 10 could have only the left seat 42 and the right seat. As the left seat 42, the middle seat and the right seat are distributed laterally, the vehicle 10 is referred to as a side-by-side vehicle, or SSV. It is contemplated that the vehicle 10 could have one or more additional rows of seats. The seat bottoms of the middle seat and the right seat can be tilted up to provide access to storage disposed under these seats. It is contemplated that the seat bottoms of one or more of these seats could be fixed. The seat bottom of the left seat 42 is fixed, but it is contemplated that it could also be tilted up. A roll cage 44, connected to the frame 18, is disposed over the cockpit area 40.

A steering assembly, including a steering wheel 46, is disposed in front of the left seat 42. The steering assembly is operatively connected to the two front wheels 20 to permit steering of the vehicle 10. As can be seen from the dotted lines in FIG. 1, the position of the steering wheel 46 can be adjusted. It is contemplated that the steering wheel 46 could have only a single fixed position. A display cluster 48 is mounted forward of the steering wheel 46. The display cluster 48 includes a number of screens and dials for the operation of the vehicle, such as a speedometer, odometer, engine speed indicator, fuel gauge, an engine temperature gauge, and the like.

The cockpit area 40 has openings 50 on the left and right sides 16 of the vehicle 10 through which the riders can enter and exit the vehicle 10. It is contemplated that a lateral cover and/or a door could be selectively disposed across each opening 50. The lateral covers/doors would be disposed across the openings 50 when the riders are riding the vehicle 10 and could be opened by the driver and/or passenger when they desire to enter or exit the cockpit area 40.

A cargo box 52 is pivotally connected to the rear portion 18B of the frame 18 rearward of the seats. The front end of the cargo box 52 is secured to the rear portion 18B of the frame 18 by latches (not shown) connected between the cargo box 52 and the frame 18. The rear end of the cargo box 52 extends rearward of the rear portion 18B of the frame 18 and of the rear wheels 22. The cargo box 52 has a pair of brackets 54 (only the left bracket 54 being shown in FIG. 1) extending downwards from its lower surface. The brackets 54 pivotally connect the cargo box 52 to the rear portion 18B of the frame 18 such that the front end of the cargo box 52 can be pivoted upwards to access the engine 38 and other internal components of the vehicle 10 located thereunder, or to unload the contents of the cargo box 52. A pneumatic piston (not shown) extends between the rear portion 18B of the frame 18 and the lower surface of the cargo box 52 in order to pivot the cargo box 52 and to support the cargo box 52 in its pivoted position. It is contemplated that the cargo box 52 could be fixed. It is also contemplated that the cargo box 52 could be omitted.

The powertrain of the vehicle 10 and components associated with the powertrain will now be described with reference to FIGS. 1 and 2. As can be seen in FIG. 1, the engine 38 is disposed longitudinally rearward of the cockpit area 40 and is mounted to the rear portion 18B of the frame 18. As will be described in more detail below, the engine 38 drives the front and rear wheels 20, 22. It is contemplate that the engine 38 could selectively switch between driving two and four of the wheels 20, 22. It is also contemplated that the engine 38 could drive only the front wheels 20 or only the rear wheels 22.

The engine 38 of the present embodiment is a four-stroke V-twin engine. Accordingly, as can be seen in FIG. 2, the engine 38 has two cylinders 56 extending at an angle from each other. The engine 38 has an output shaft (not shown) extending horizontally and laterally. It is contemplated that other types of motors could be used. For example, it is contemplated that the motor could be a two-stroke engine with in-line cylinders 56 or that the motor could be an electric motor. The engine 38 receives fuel from a fuel tank (not shown) disposed to the right of the engine 38. It is contemplated that the fuel tank could be located elsewhere on the vehicle. The engine 38 receives air via an air induction system (not shown) disposed above the fuel tank. The air induction system includes an intake manifold connected to the two cylinders 56, a throttle body connected upstream of the intake manifold, an air box connected upstream of the throttle body, and a number of air intake conduits extending between these components. An exhaust system (not shown) delivers exhaust gases from the engine 38 to the atmosphere. The exhaust system includes exhaust conduits, an exhaust manifold, and a muffler.

As can be seen in FIG. 2, a continuously variable transmission (CVT) 58 is disposed on a left side of the engine 38. The CVT 58 has a driving pulley, a driven pulley and a belt (all not shown) looped around the driving and driven pulleys to transmit torque therebetween. The driving pulley, the driven pulley and the belt are disposed inside a cover 60. The driving pulley is mounted on the output shaft of the engine 38 so as to rotate therewith. It is contemplated that the driving pulley could be connected to another shaft that is driven by the output shaft. The driven pulley is mounted on an input shaft of a transmission 62 so as to drive the input shaft and therefore the transmission 62. The transmission 62 is connected to the rear portion of the engine 38. An air intake conduit 64 is connected to the front portion of the CVT 58 for drawing cool air inside the cover 60 of the CVT 58 for cooling the CVT 58. The heated air inside the cover 60 of the CVT 58 is released to the atmosphere by a conduit 66 connected to the rear portion of the CVT 58.

The transmission 62 transfers the torque from the CVT 38 to a front driveshaft (not shown) and a rear differential 68. The front driveshaft passes through a casing of the engine 38 and connects to another front driveshaft 70 via a universal joint 72. The front end of the front driveshaft 70 connects to another universal joint 74. The universal joint 74 connects the front driveshaft 70 to a front differential 76. The front differential 76 is connected, via left and right constant velocity joints (not shown) enclosed in flexible boots 78, to left and right front drive axles 80. The front drive axles 80 are connected to spindles 82 of the front wheels 20 via constant velocity joints (not shown) enclosed in flexible boots 84. The spindles 82 are rotatably suspended from the frame 18 by the front suspension assemblies 26. The rear differential 68 is connected, via left and right constant velocity joints (not shown) enclosed in flexible boots 86, to left and right rear drive axles 88. The rear drive axles 88 are connected to spindles 90 of the rear wheels 22 via constant velocity joints (not shown) enclosed in flexible boots 92. The spindles 90 are rotatably suspended from the frame 18 by the rear suspension assemblies 28 as will be described in greater detail below.

Figure 3:
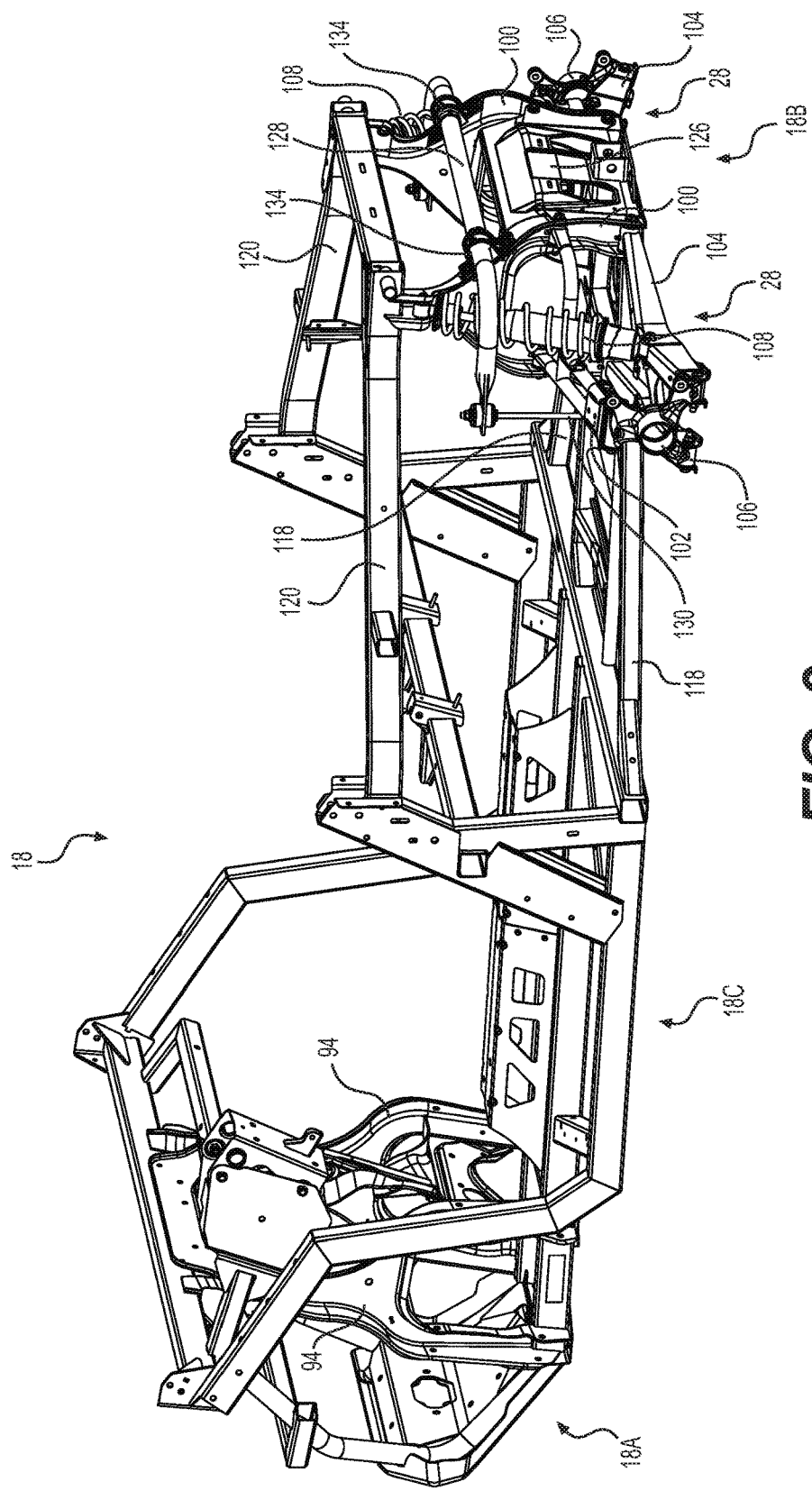
FIG. 3 is a perspective view taken from a rear, left side of a portion of the frame and of rear suspension assemblies of the vehicle of FIG. 1.

With reference to FIGS. 1 and 3, each front suspension assembly 26 includes a suspension support 94, upper and lower control arms (not shown), a knuckle (not shown) and a shock absorber 96. The suspension support 94 is connected to the front portion 18A of the frame 18 as can be seen in FIG. 3. The suspension support 94 has a generally inverted Y-shape. The inner ends of the upper control arm are pivotally connected to the suspension support 94. The outer end of the upper control arm is pivotally connected to the top of the knuckle. The lower control arm is disposed vertically below the upper control arm. The inner ends of the lower control arm are pivotally connected to the suspension support 94. The outer end of the lower control arm is pivotally connected to the bottom of the knuckle. The knuckle has a central aperture that rotationally supports the spindle 82 of the corresponding front wheel 20 therein. The knuckle is operatively connected to the steering wheel 46 by a steering linkage (not shown) such that when the steering wheel 46 is turned, the knuckle turns about a steering axis to steer the corresponding front wheel 20. The upper end of the shock absorber 96 is pivotally connected to suspension support 94. The lower end of the shock absorber 96 is pivotally connected to the lower control arm. It is contemplated that that the lower end of the shock absorber 96 could alternatively be connected to the upper control arm. The front suspension assembly 26 described above is only one possible embodiment of a front suspension assembly for the vehicle 10. Other types of front suspension assemblies are contemplated.

Additional features of a vehicle similar to the vehicle 10 can be found in International Patent Application No. PCT/IB2015/050801, filed Feb. 2, 2015, the entirety of which is incorporated herein by reference.

Turning now to FIGS. 3 to 15, the rear suspension assemblies 28 and associated components will be described in more detail. Each rear suspension assembly 28 includes a suspension support 100, an upper control arm 102, a lower control arm 104, a knuckle 106 and a shock absorber 108. The suspension support 100 is connected to the rear portion 18B of the frame 18 as will be described in greater detail below. The inner ends of the upper control arm 102 are pivotally connected to the suspension support 100. The outer end of the upper control arm 102 is pivotally connected to the top of the knuckle 106. The lower control arm 104 is disposed vertically below the upper control arm 102. The inner ends of the lower control arm 104 are pivotally connected to the suspension support 100. The outer ends of the lower control arm 104 are pivotally connected to the bottom of the knuckle 106. The knuckle 106 has a central aperture 110 (see FIG. 9) that rotationally supports the spindle 90 of the corresponding rear wheel 22 therein. The upper end of the shock absorber 108 is pivotally connected to suspension support 100. The lower end of the shock absorber 108 is pivotally connected to the lower control arm 104. The shock absorber 108 has a central axis 111 (see FIGS. 4 and 8). It is contemplated that the lower end of the shock absorber 108 could alternatively be connected to the upper control arm 102.

As best seen in FIGS. 5 to 8, each suspension support 100 has a lower front arm 112, a lower rear arm 114 and an upper arm 116 which together define a generally inverted-Y shape. Each of the arms 112, 114, 116 of the suspension supports 100 defines a channel that is opened laterally outwardly. The channels of the arms 112, 114, 116 of the suspension supports 100 receive the ends of the control arms 102, 104 and of the shock absorbers 108 for connecting the control arms 102, 104 and the shock absorbers 108 to the suspension supports 100 as described in greater detail below. The lower front arms 112 are disposed forward of the central axes 111 of the shock absorbers 108 and the lower rear arms 114 are disposed rearward of the central axes 111 of the shock absorbers 108.

Figure 4:
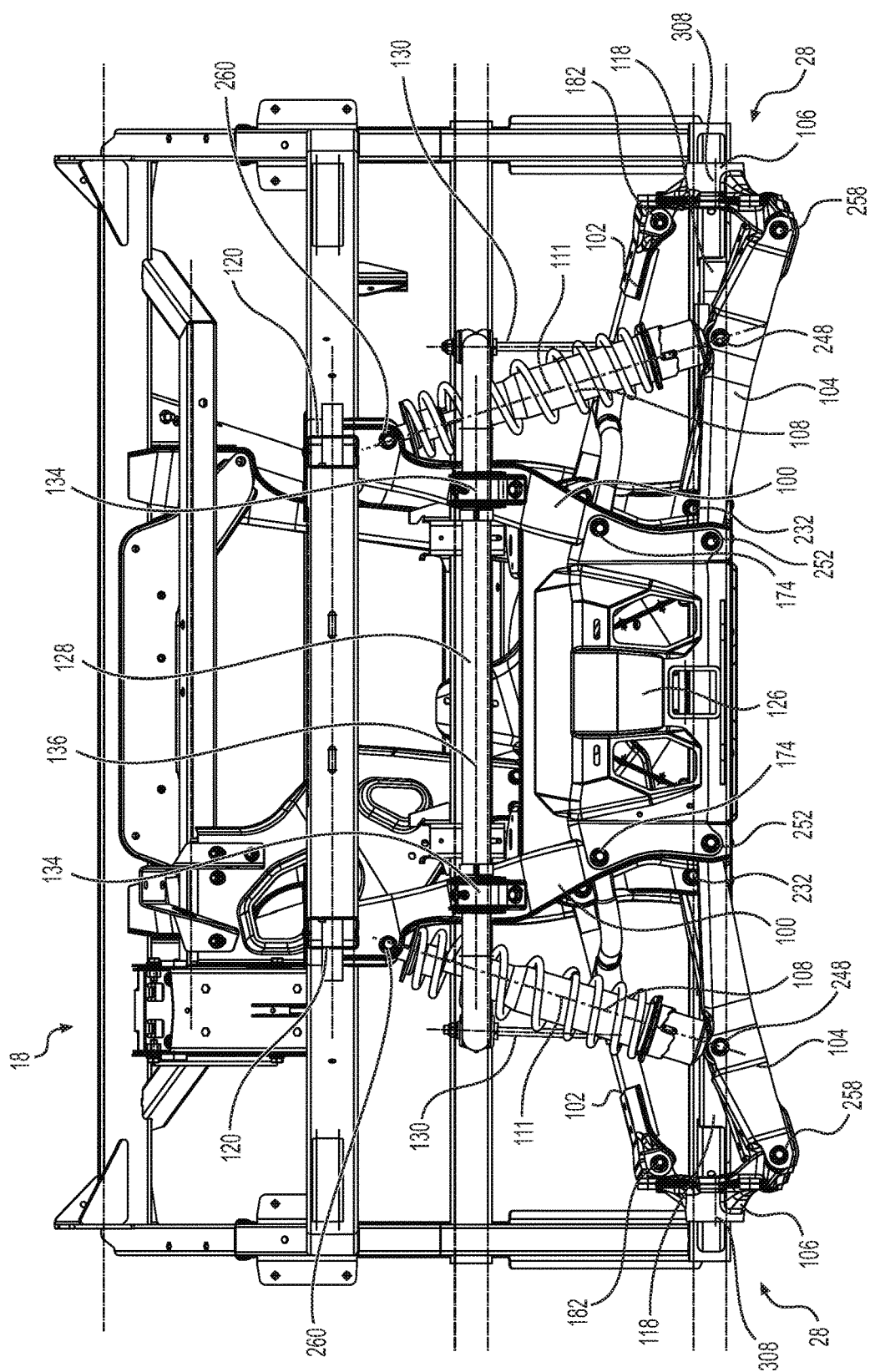
FIG. 4 is a rear elevation view of the portion of the frame and of the rear suspension assemblies of FIG. 3.

As best seen in FIGS. 3 and 4, the lower front and rear arms 112, 114 of the suspension supports 100 are connected at their lower ends to the lower frame members 118 of the rear portion 18B of the frame 18. The upper arms 116 of the suspension supports 100 are connected at their upper ends to the upper frame members 120 of the rear portion 18B of the frame 18. The lower frame members 118 are received in L-shaped indentations 122 (FIG. 5) formed in the lower ends of the lower front and rear arms 112, 114 of the suspension supports 100. The upper frame members 120 are received in channels 124 formed in the upper ends of the upper arms 116 of the suspension supports 100. In the present embodiment, the suspension supports 100 are welded to the lower and upper frame members 118, 120, but it is contemplated that they could be connected by other means such as, but not limited to, via fasteners.

As best seen in FIG. 4, the suspension supports 100 extend away from each other as they extend from the lower frame members 118 to the upper frame members 120. As can also be seen in FIG. 4, a rear plate 126 is fastened to the back of the lower rear arms 114 and extends therebetween.

Figure 6:
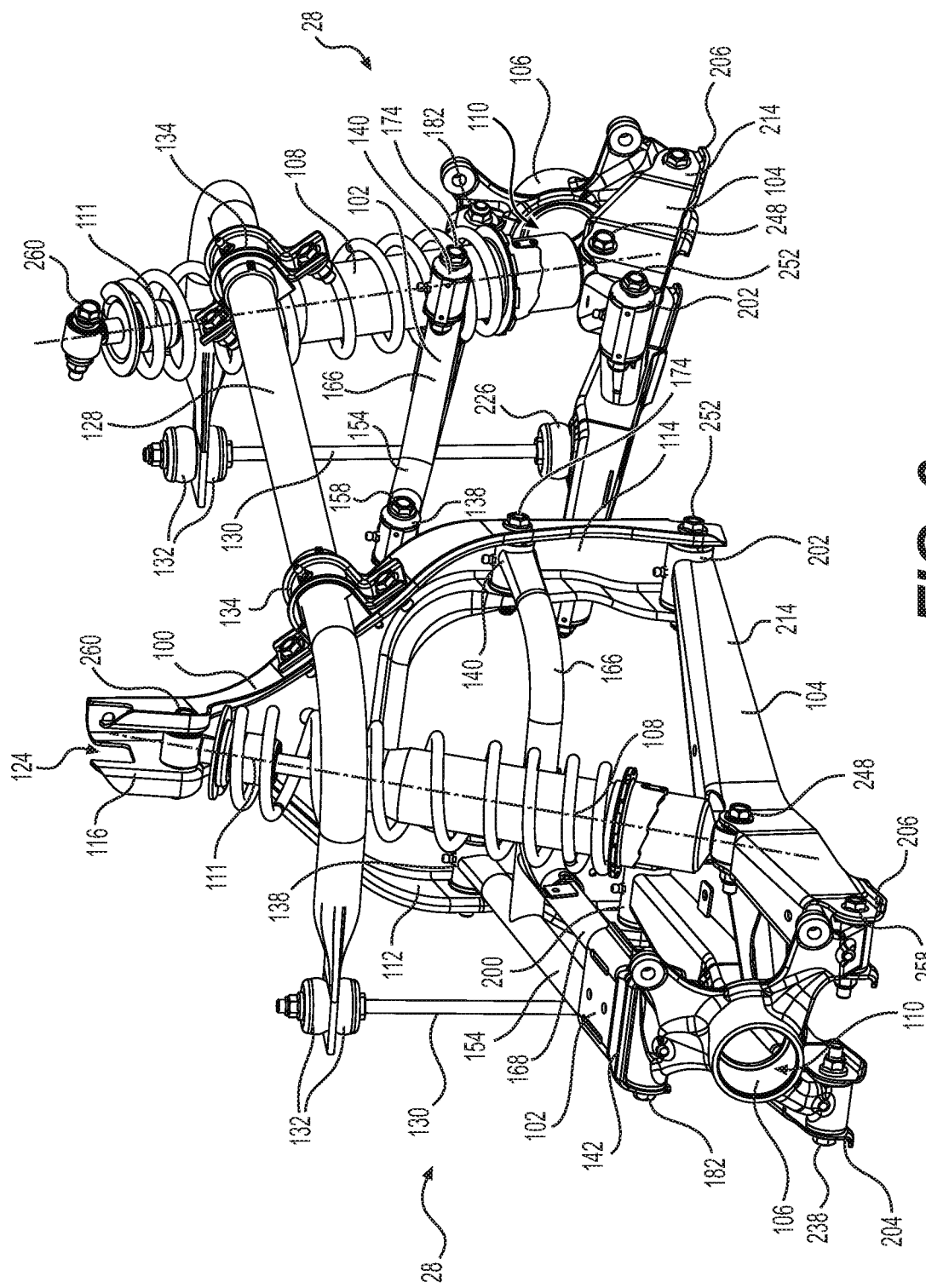
FIG. 6 is a perspective view taken from a rear, left side of the rear suspension assemblies of FIG. 3 with a right suspension support removed for clarity.
Figure 7:
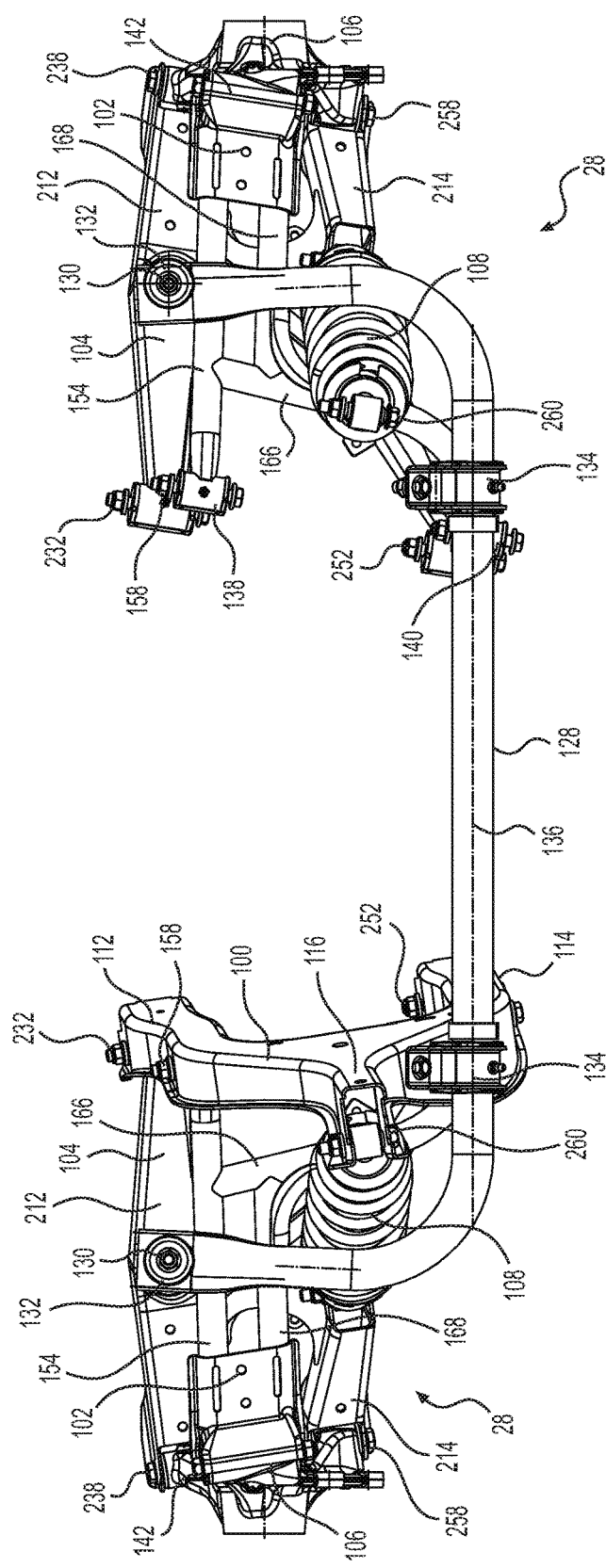
FIG. 7 is a top plan view of the rear suspension assemblies of FIG. 3 with the right suspension support removed for clarity.
Figure 8:
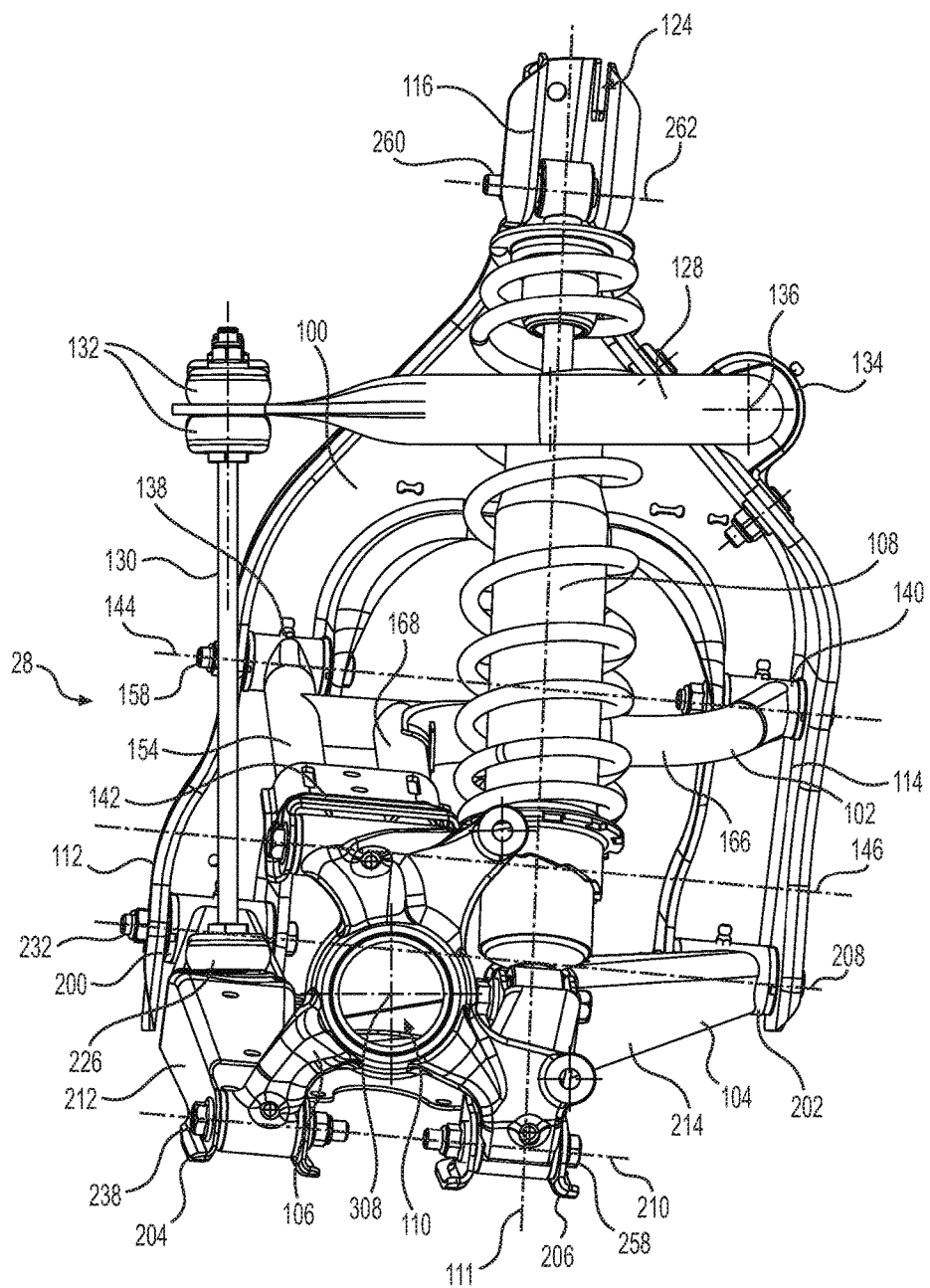
FIG. 8 is a left side elevation view of the rear suspension assemblies of FIG. 3.

As can be seen in FIGS. 3 to 8, a sway bar 128, also known as an anti-roll bar, is pivotally connected between the left and right rear suspension assemblies 28. The sway bar 128 increases the roll stiffness of the vehicle 10. The sway bar 128 has a laterally extending central portion and left and right arms extending forwardly from the ends of the central portion of the sway bar 128. The left and right ends of the sway bar 128 (i.e. the front ends of the arms of the sway bar 128) are connected to the left and right lower control arms 104 by left and right links 130 respectively. The ends of the sway bar 128 are connected to the upper ends of the links 130 by dampers 132. As can be seen, the ends of the sway bar 128 are each disposed between two dampers 132. The connections between the lower ends of the links 130 and the lower control arms 104 will be described in greater detail below. It is contemplated that the lower ends of the links 130 could alternatively be connected to the upper control arms 102. The sway bar 128 is also pivotally connected to the suspension supports 100. More specifically, the laterally extending central portion of the sway bar 128 is supported by a pair of pillow blocks 134 connected to the rear side of the suspension supports 100. The pillow blocks 134 are fastened to the portions of the suspension supports 100 extending between the upper arms 106 and the lower rear arms 104. As such, the sway bar 128 can pivot and twist about a sway bar pivot axis 136 corresponding to the central axes of the pillow blocks 134 and of the laterally extending central portion of the sway bar 128. As best seen in FIGS. 7 and 8, the links 130 and the ends of the sway bar 128 are disposed forward of the central axes 111 of the shock absorbers 108. As is also best seen in FIGS. 7 and 8, the laterally extending central portion of the sway bar 128, the pillow blocks 134 and the sway bar pivot axis 136 are disposed rearward of the central axes 111 of the shock absorbers 108.

As the rear right suspension assembly 28 is a mirror image of the rear left suspension assembly 28, only the rear left suspension assembly will be described in detail below. Components and features of the rear right suspension assembly 28 that correspond to those of the rear left suspension assembly 28 have been labeled with the same reference numerals in the figures. It is contemplated that the rear right and left suspension assemblies 28 may differ partly from each other.

The upper control arm 102 has a front inner end 138, a rear inner end 140 and an outer end 142. As best seen in FIGS. 6 and 8, the front inner end 138 is received in the channel defined by the lower front arm 112 of the suspension support 100 and is pivotally connected to the lower front arm 112 about a pivot axis 144 at a position forward of the central axis 111 of the shock absorber 108. The rear inner end 140 is received in the channel defined by the lower rear arm 114 of the suspension support 100 and is pivotally connected to the lower rear arm 114 about the pivot axis 144 at a position rearward of the central axis 111 of the shock absorber 108. The outer end 142 is pivotally connected to an upper end of the knuckle 106 about an upper pivot axis 146 at a position forward of the central axis 111 of the shock absorber 108. The pivot axis 144 and the upper pivot axis 146 are parallel to each other.

With reference to FIGS. 9 to 15, the upper control arm 102 has an upper front member 148 and an upper rear member 150. The upper front member 148 is disposed forward of the upper rear member 150 and of the central axis 111 of the shock absorber 108. The upper front member 148 has a tube 152 defining the front inner end 138 and a straight tube 154. The straight tube 154 is connected to the tube 152 and extends laterally outwardly therefrom. As can be seen in FIG. 8, the straight tube 154 is disposed longitudinally between the link 130 and the central axis 111 of the shock absorber 108. The tube 152 defines an aperture 156. The tube 152 is received in the channel defined by the lower front arm 112 of the suspension support 100 and a fastener 158 (FIG. 8) is inserted through the lower front arm 112 and the aperture 156 of the tube 152 to pivotally connect the upper front member 148 to the suspension support 100 about the pivot axis 144. The outer end 160 (FIGS. 13 and 14) of the upper front member 148 is connected to a bracket 162.

Figure 9:
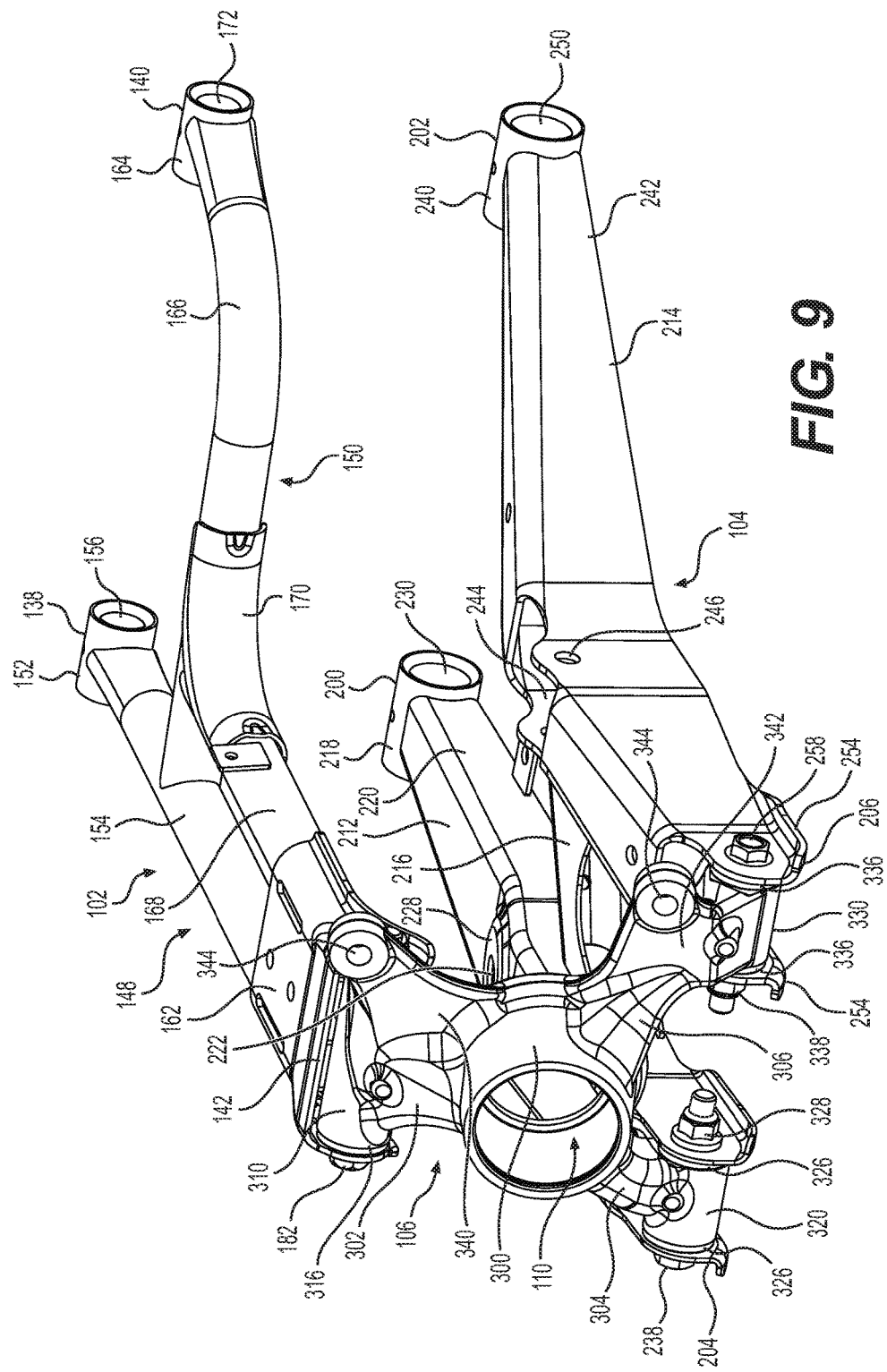
FIG. 9 is a perspective view taken from a rear, left side of the two control arms and knuckle of the rear left suspension of FIG. 3.
Figure 12:
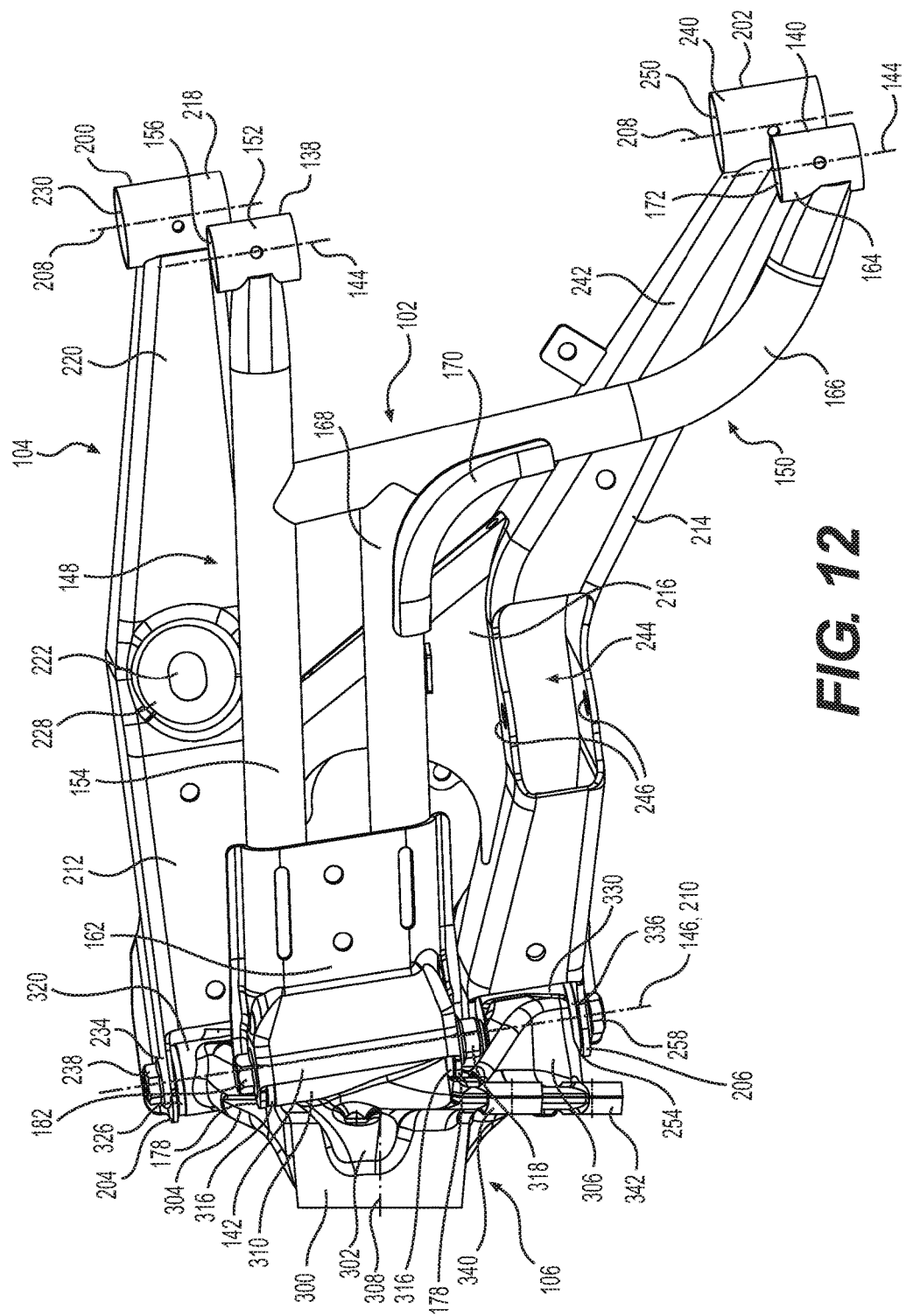
FIG. 12 is a top plan view of the two control arms and knuckle of FIG. 9.

The upper rear member 150 has a tube 164 defining the rear inner end 140, a bent tube 166 defining a first portion of the upper rear member 150, a straight tube 168 defining a second portion of the upper rear member 150, and a curved bracket 170. The bent tube 166 is connected to the tube 164, then extends laterally outwardly therefrom, then bends and extends forwardly. The front end of the bent tube 166 is connected to the straight tube 154 of the upper front member 148. As can be seen in FIGS. 6 and 7, the bent tube 166 is disposed laterally between the central axis 111 of the shock absorber 108 and the suspension support 100. The straight tube 168 is connected to the forwardly extending portion of the bent tube 166 at a position longitudinally between the central axis 111 of the shock absorber 108 and the straight tube 154 of the upper front member. From the bent tube 166, the straight tube 168 extends laterally outwardly. As best seen in FIG. 12, the straight tubes 154, 168 of the upper front and rear members 148, 150 are parallel to each other, but it is contemplated that they could not be parallel to each other. As best seen in FIG. 8, the straight tube 168 is disposed longitudinally between the link 130 and the central axis 111 of the shock absorber 108. The curved bracket 170 is connected between the bent tube 166 and the straight tube 168 as shown in FIG. 9 to reinforce the connection between the tubes 166, 168. The tube 164 defines an aperture 172. The tube 164 is received in the channel defined by the lower rear arm 114 of the suspension support 100 and a fastener 174 (FIG. 6) is inserted through the lower rear arm 114 and the aperture 172 of the tube 164 to pivotally connect the upper rear member 150 to the suspension support 100 about the pivot axis 144. The outer end 176 (FIGS. 13 and 14) of the upper rear member 150 is connected to the bracket 162.

Figure 10:
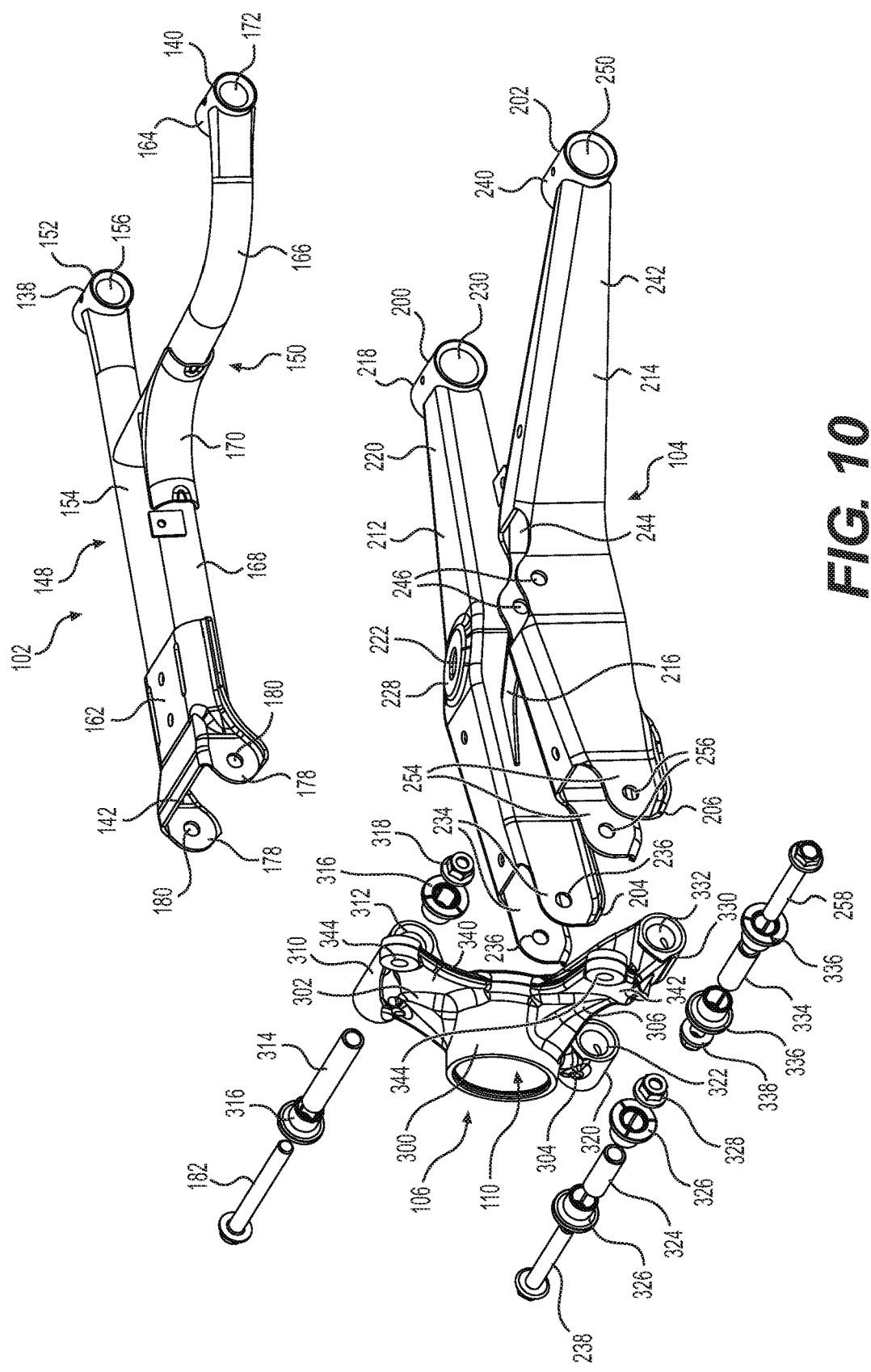
FIG. 10 an exploded view of the two control arms and knuckle of FIG. 9.

As best seen in FIG. 10, the bracket 162 has a generally flat top portion and two arcuate sides. The arcuate sides generally follow the outer surfaces of the tubes 154, 168 over which the bracket 162 is disposed. As can be seen, the lower edges of the bracket 162 flare out. The laterally outer end of the bracket 162, which defines the outer end 142 of the upper control arm 102, defines a pair of longitudinally spaced apart tabs 178. The tabs 178 each define an aperture 180. As will be described in greater detail below, the tabs 178 are disposed on either side of an upper end of the knuckle 106 and a fastener 182 is inserted through the apertures 180 of the tabs 178 to pivotally connect the outer end of the upper control arm 102 to the knuckle 106 about the upper pivot axis 146. As can be seen in FIG. 8, the bracket 162 is connected to the knuckle 106 at a position forward of the central axis 111 of the shock absorber 108.

In the present embodiment, the various components of the upper control arm 102 are made of metal and are welded to one another. It is also contemplated that the various components of the upper control arm 102 could be connected to one another in other ways, such as by using brackets and fasteners, and/or that at least some of the components could be integrally formed. It is also contemplated that the upper front member 148 and the upper rear member 150 could be replaced by a single upper member pivotally connected at its outer end to the knuckle 106 and at its inner end to the front and rear lower arms 112, 114 of the suspension support 100. It is also contemplated that the upper control arm 102 could be made of more or less components than described above. It is also contemplated that the tubes described above could be replaced with other types of structural components such as, but not limited to, beams, struts, channels, bent sheet metal, cast metal part and machined metal parts. It is also contemplated that the upper control arm 102 could be made of a material other than metal.

The lower control arm 104 has a front inner end 200, a rear inner end 202, a front outer end 204 and a rear outer end 206. As best seen in FIGS. 6 and 8, the front inner end 200 is received in the channel defined by the lower front arm 112 of the suspension support 100 and is pivotally connected to the lower front arm 112 about a pivot axis 208 at a position forward of the central axis 111 of the shock absorber 108. The rear inner end 202 is received in the channel defined by the lower rear arm 114 of the suspension support 100 and is pivotally connected to the lower rear arm 114 about the pivot axis 208 at a position rearward of the central axis 111 of the shock absorber 108. The front outer end 204 is pivotally connected to a lower end of the knuckle 106 about a lower pivot axis 210 at a position forward of the central axis 111 of the shock absorber 108. The rear outer end 206 is pivotally connected to a lower end of the knuckle 106 about the lower pivot axis 210 at a position that is spaced from and rearward of the front outer end 204. Although both outer ends 204, 206 pivot about the same lower pivot axis 210, it is contemplated that they could pivot about different but parallel pivot axes. The pivot axis 208 and the lower pivot axis 210 are parallel to each other. The pivot axis 208 and the lower pivot axis 210 are also parallel to the pivot axis 144 and the upper pivot axis 146.

Figure 13:
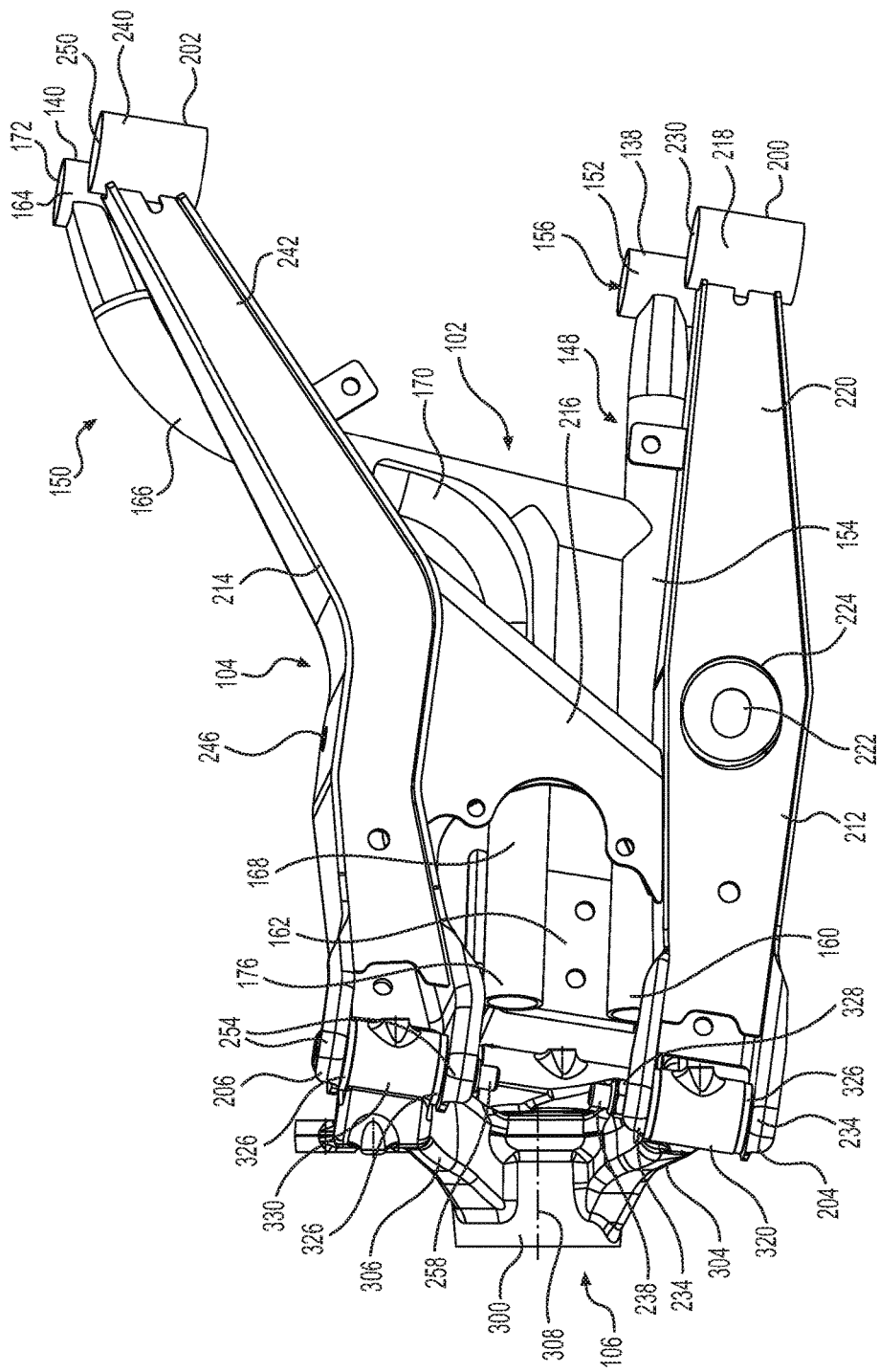
FIG. 13 is a bottom plan view of the two control arms and knuckle of FIG. 9.
Figure 14:
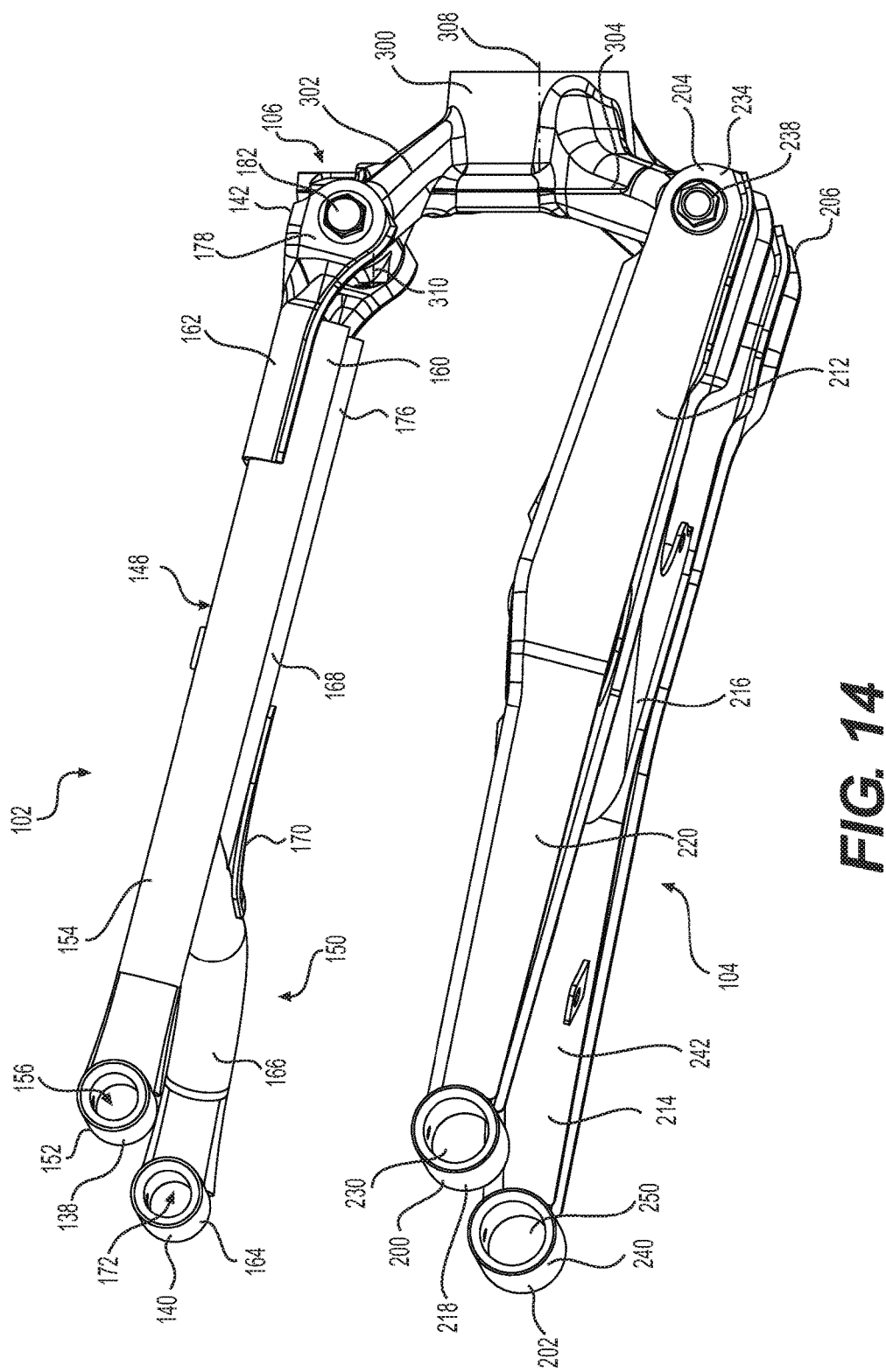
FIG. 14 is a front elevation view of the two control arms and knuckle of FIG. 9.

With reference to FIGS. 9 to 15, the lower control arm 104 has a lower front member 212, a lower rear member 214 and a connecting member 216. The lower front member 212 is disposed forward of the lower rear member 214 and of the central axis 111 of the shock absorber 108. The lower front member 212 has a tube 218 defining the front inner end 200 and a beam 220. The beam 220 is connected to the tube 218 and extends laterally outwardly therefrom. As can be seen in FIGS. 13 and 14, the beam 220 is thickest and widest near its center and tapers in height and width toward its ends. The beam 220 is made from a C-beam closed at its bottom by a plate. The beam 220 has an aperture 222 on a top thereof and a larger aperture 224 (FIG. 13) on a bottom thereof. The lower end of the link 130 is received through the aperture 222. As best seen in FIG. 8, a damper 226 is disposed around the link 130 on a boss 228 formed by the beam 220 around the aperture 222. Another damper (not shown) is inserted in the beam 220 by the aperture 224 around the link 130. The dampers 226 connect the lower end of the link 130 to the lower front member 214. The tube 218 defines an aperture 230. The tube 218 is received in the channel defined by the lower front arm 112 of the suspension support 100 and a fastener 232 (FIG. 8) is inserted through the lower front arm 112 and the aperture 230 of the tube 218 to pivotally connect the lower front member 212 to the suspension support 100 about the pivot axis 208. The laterally outer end of the beam 220, which defines the front outer end 204 of the lower control arm 104, defines a pair of longitudinally spaced apart tabs 234. The lower portions of the tabs 234 flare out. The tabs 234 each define an aperture 236. As will be described in greater detail below, the tabs 234 are disposed on either side of a lower portion of the knuckle 106 and a fastener 238 is inserted through the apertures 236 of the tabs 234 to pivotally connect the front outer end 204 of the lower control arm 104 to the knuckle 106 about the lower pivot axis 210. As can be seen in FIG. 8, the tabs 234 are connected to the knuckle 106 at a position forward of the central axis 111 of the shock absorber 108.

Figure 15:
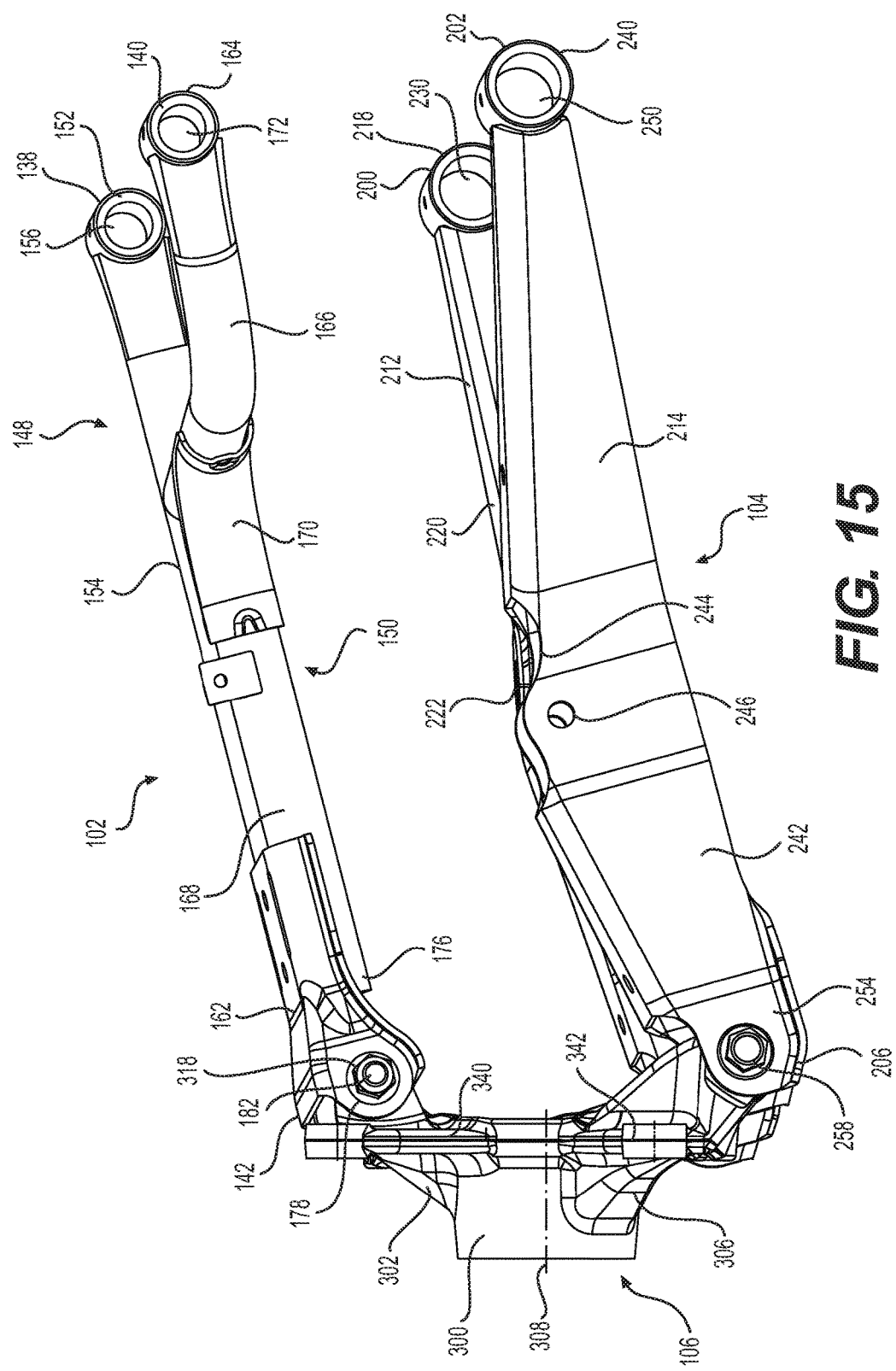
FIG. 15 is a rear elevation view of the two control arms and knuckle of FIG. 9.

The lower rear member 214 has a tube 240 defining the rear inner end 202 and a beam 242. The beam 242 is connected to the tube 240. As best seen in FIG. 12, the beam 242 extends laterally outwardly and forwardly from the tube 240, then laterally outwardly and then laterally outwardly and forwardly. As can be seen in FIG. 15, the beam 242 is thickest near its center and tapers in height toward its ends. The beam 242 is made from a C-beam closed at its bottom by a plate. The beam 242 has an aperture 244 on a top thereof and two apertures 246 on a front and rear thereof in alignment with the aperture 244. The lower end of the shock absorber 108 is received in the aperture 244. A fastener 248 (FIG. 4) is inserted through the apertures 246 and the lower end of the shock absorber 108 to pivotally connect the shock absorber to the beam 242. The tube 240 defines an aperture 250. The tube 240 is received in the channel defined by the lower rear arm 114 of the suspension support 100 and a fastener 252 (FIG. 6) is inserted through the lower rear arm 114 and the aperture 250 of the tube 240 to pivotally connect the lower rear member 214 to the suspension support 100 about the pivot axis 208. The laterally outer end of the beam 242, which defines the rear outer end 206 of the lower control arm 104, defines a pair of longitudinally spaced apart tabs 254. The lower portions of the tabs 254 flare out. The tabs 254 each define an aperture 266. As will be described in greater detail below, the tabs 254 are disposed on either side of a lower portion of the knuckle 106 and a fastener 258 is inserted through the apertures 256 of the tabs 254 to pivotally connect the rear outer end 206 of the lower control arm 104 to the knuckle 106 about the lower pivot axis 210. As best seen in FIG. 13, the beams 220, 242 are spaced further apart than the tubes 154, 168 of the upper control arm 102.

The connecting member 216 is a C-beam extending between and connecting the beams 220 and 242 to each other. As best seen in FIG. 13, the connecting member 216 is wider at its connection to the beam 242 than at its connection to the beam 220.

In the present embodiment, the various components of the lower control arm 104 are made of metal and are welded to one another. It is also contemplated that the various components of the lower control arm 104 could be connected to one another in other ways, such as by using brackets and fasteners, and/or that at least some of the components could be integrally formed. It is also contemplated that the lower front member 212 and the lower rear member 214 could be replaced by a single lower member pivotally connected at its outer end to two positions on the knuckle 106 and at its inner end to the front and rear lower arms 112, 114 of the suspension support 100. It is also contemplated that the lower control arm 104 could be made of more or less components than described above. It is also contemplated that the beams and tubes described above could be replaced with other types of structural components such as, but not limited to, tubes, struts, channels, bent sheet metal, cast metal part and machined metal parts. It is also contemplated that the lower control arm 104 could be made of a material other than metal.

As can be seen in FIGS. 4 to 8, from its lower end that is pivotally connected to the lower rear member 214 of the lower control arm 104, the shock absorber 108 extends upward and laterally inward. The upper end of the shock absorber 108 is received in the channel defined by the upper arm 116 of the suspension support 100. A fastener 260 (FIG. 5) is inserted through the upper arm 116 and the upper end of the shock absorber 108 to pivotally connect the shock absorber 108 to the suspension support 100 about a pivot axis 262 (FIG. 8). As can be seen in FIG. 8, the pivot axis 208 about which the lower control arm 104 pivots relative to the suspension support 100 is vertically lower than the pivot axis 144 about which the upper control arm 102 pivots relative to the suspension support 100. The pivot axis 144 is vertically lower than the sway bar pivot axis 136. The sway bar pivot axis 136 is vertically lower than the pivot axis 262 about which the upper end of the shock absorber 108 pivots relative to the suspension support 100.

Figure 11:
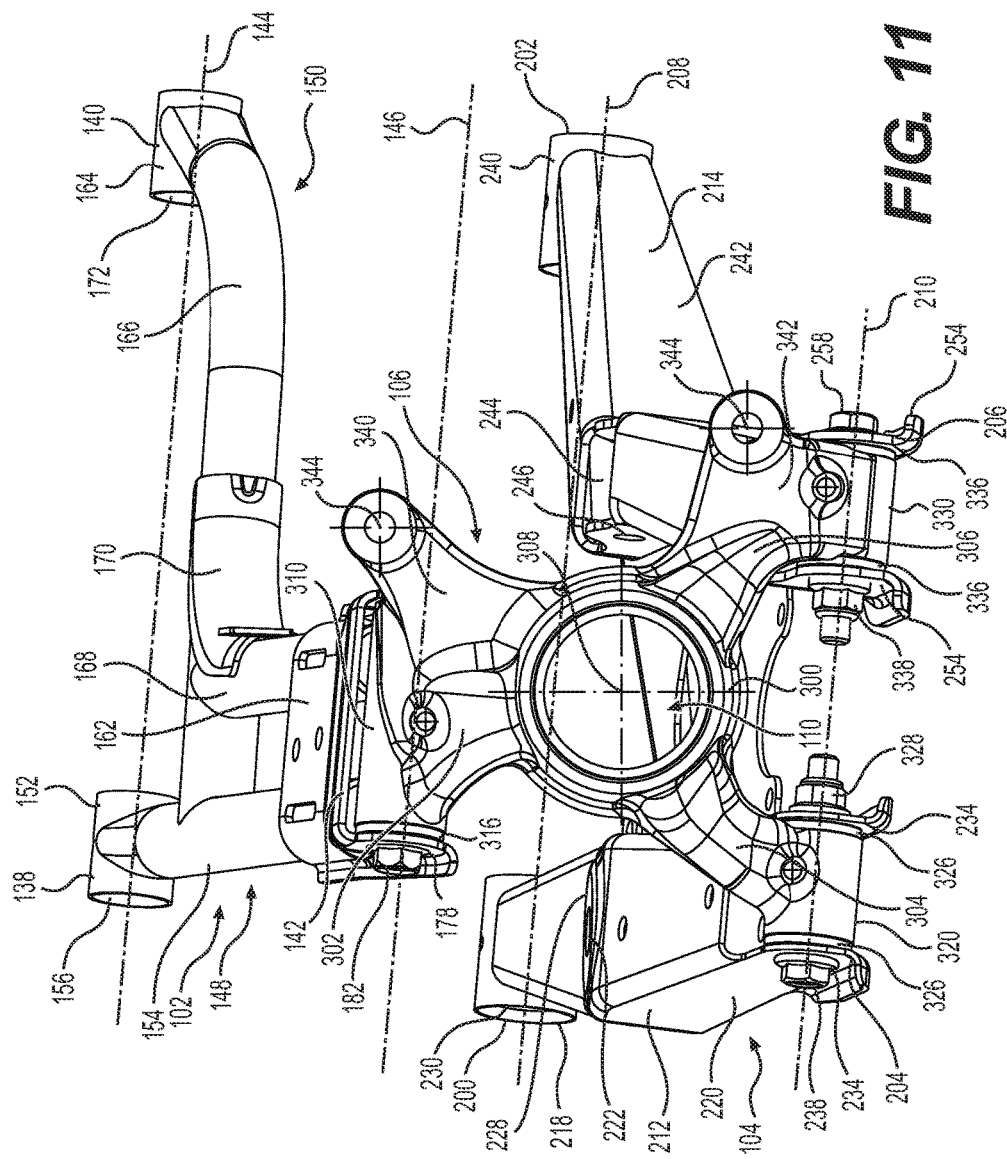
FIG. 11 is a left side elevation view of the two control arms and knuckle of FIG. 9.

The knuckle 106 will now be described in more detail with reference to FIGS. 9 to 15. The knuckle 106 has a knuckle body 300, an upper arm 302 extending upward from the knuckle body 300, a front lower arm 304 extending downward and forward from the knuckle body 300 and a rear lower arm 306 extending downward and rearward from the knuckle body 300. As can be seen in FIGS. 14 and 15, the upper arm 302, the front lower arm 304 and the rear lower arm 306 also extend laterally inward as they extend away from the knuckle body 300. As best seen in FIG. 11, the upper arm 302, the front lower arm 304 and the rear lower arm 306 define a generally inverted-Y shape. The three arms 302 permit the outer ends 142, 204, 206 of the control arms 102, 104 to be connected to the knuckle 106 separately from one another. The knuckle body 300, the upper arm 302, the front lower arm 304 and the rear lower arm 306 are integrally formed by a metal casting process. It is contemplated that one or more of the arms 302, 304, 306 could be connected to the knuckle body 300 in other ways such as, but not limited to, by welding or fastening. It is also contemplate that the knuckle 106 could be made of a material other than metal. It is also contemplated that the knuckle 106 could have two upper arms.

The knuckle body 300 is generally cylindrical and defines the central aperture 110 that rotationally supports the spindle 90 of the corresponding rear wheel 22 therein. Bearing and seals (not shown) are disposed radially between the spindle 90 and the knuckle body 300. The central axis of the central aperture 110 corresponds to the axis of rotation 308 (FIGS. 1 and 11) of the corresponding rear wheel 22. It is contemplated that, in a vehicle where the wheel connected to the knuckle 106 is not a driving wheel, instead of having the central aperture 110, the spindle 90 could be integrally formed with the knuckle body 300. In such an embodiment, the hub 30 is provided with a central aperture and is rotationally mounted on the spindle 90.

As can be see in FIG. 10, the upper arm 302 has a tubular distal end 310 defining an aperture 312. The aperture 312 defines the upper pivot axis 146. A sleeve 314 is inserted in the aperture 312. A pair of bushings 316 is inserted in the ends of the aperture 314 and partially covers the front and rear sides of the tubular distal end 310. The tubular distal end 310 is received between the tabs 178 of the outer end 142 of the upper control arm 102. The bushings 316 are disposed between the tabs 178 and the tubular distal end 310. The fastener 182 is inserted through the apertures 180 of the tabs 178, the bushings 316, and the sleeve 314. A nut 318 is fastened on the end of the fastener 182. As a result, the upper arm 302 is pivotally connected to the outer end 142 of the upper control arm 102 about the upper pivot axis 146.

The front lower arm 304 has a tubular distal end 320 defining an aperture 322. As can be seen in FIG. 11, the tubular distal end 320 is disposed forward of the central aperture 110 of the knuckle body 300. As can also be seen in FIG. 11, the tubular distal end 320 of the front lower arm 304 is shorter than the tubular distal end 310 of the upper arm 302. The aperture 322 defines the lower pivot axis 210. A sleeve 324 is inserted in the aperture 322. A pair of bushings 326 is inserted in the ends of the aperture 324 and partially covers the front and rear sides of the tubular distal end 320. The tubular distal end 320 is received between the tabs 234 of the front outer end 204 of the lower control arm 104. The bushings 326 are disposed between the tabs 234 and the tubular distal end 320. The fastener 238 is inserted through the apertures 236 of the tabs 234, the bushings 326, and the sleeve 324. A nut 328 is fastened on the end of the fastener 238. As a result, the front lower arm 304 is pivotally connected to the front outer end 204 of the lower control arm 104 about the lower pivot axis 210.

The rear lower arm 306 has a tubular distal end 330 defining an aperture 332. As can be seen in FIG. 11, the tubular distal end 330 is longitudinally spaced from and is disposed rearward of the tubular distal end 320 of the lower front arm 304 and is disposed rearward of the central aperture 110 of the knuckle body 300. As can also be seen in FIG. 11, the tubular distal end 330 of the rear lower arm 306 is shorter than the tubular distal end 310 of the upper arm 302. The aperture 332 defines the lower pivot axis 210. It is contemplated that the apertures 322 and 332 of the front and rear lower arms 304 and 306 could not be coaxial and could define two parallel lower pivot axes as opposed to the single pivot axis 210. A sleeve 334 is inserted in the aperture 332. A pair of bushings 336 is inserted in the ends of the aperture 334 and partially covers the front and rear sides of the tubular distal end 330. The tubular distal end 330 is received between the tabs 254 of the rear outer end 206 of the lower control arm 104. The bushings 336 are disposed between the tabs 254 and the tubular distal end 330. The fastener 258 is inserted through the apertures 266 of the tabs 254, the bushings 336, and the sleeve 334. A nut 338 is fastened on the end of the fastener 258. As a result, the rear lower arm 306 is pivotally connected to the rear outer end 206 of the lower control arm 104 about the lower pivot axis 210.

An upper caliper mounting tab 340 extends rearward and upward from the rear side of the upper arm 302 of the knuckle 106 and from the portion of the knuckle body 300 disposed rearward of the upper arm 302. The upper caliper mounting tab 340 is integrally formed with the upper arm 302 and the knuckle body 300, but it is contemplated that it could be connected in other ways such as, but not limited to, by fastening the upper caliper mounting tab 340 to the upper arm 302 and the knuckle body 300. It is also contemplated that the upper caliper mounting tab 340 could be connected to only one of the upper arm 302 and the knuckle body 300. A lower caliper mounting tab 342 extends rearward from the rear side of the rear lower arm 306 of the knuckle 106. The lower caliper mounting tab 342 is integrally formed with the rear lower arm 306, but it is contemplated that it could be connected in other ways such as, but not limited to, by fastening the lower caliper mounting tab 342 to the rear lower arm 306. It is also contemplated that the lower caliper mounting tab 342 could be connected to only the knuckle body 300 or to both the rear lower arm 306 and the knuckle body 300. The upper and lower caliper mounting tabs 340, 342 each define an aperture 344. The apertures 344 receive the fasteners 346 (shown in FIG. 5 for the rear right knuckle 106) used to mount the caliper 36 to the knuckle 106 via the upper and lower caliper mounting tabs 340, 342.

Modifications and improvements to the above-described embodiments of the present technology may become apparent to those skilled in the art. The foregoing description is intended to be exemplary rather than limiting. The scope of the present technology is therefore intended to be limited solely by the scope of the appended claims.

What is claimed is:

1. A vehicle comprising:
a frame;
a left suspension assembly connected to the frame;
a right suspension assembly connected to the frame;
each of the left and right suspension assemblies comprising:
a suspension support connected to the frame, the suspension support comprising:
a lower front arm defining a channel;
a lower rear arm defining a channel; and
an upper arm defining a channel,
the channels of the lower front arm, the lower rear arm and the upper arm being interconnected;
a lower control arm having an inner end pivotally connected to the lower front arm at a first position and to the lower rear arm at a second position, the first and second positions being longitudinally spaced from each other, the inner end being received at least in part in the channels defined by the lower front arm and the lower rear arm;
an upper control arm having an inner end pivotally connected to the lower front arm at a third position and to the lower rear arm at a fourth position, the third and fourth positions being longitudinally spaced from each other, the inner end being received at least in part in the channels defined by the lower front arm and the lower rear arm;
a knuckle pivotally connected to an outer end of the lower control arm and to an outer end of the upper control arm; and
a shock absorber having an upper end pivotally connected to the upper arm and a lower end pivotally connected to one of the lower and upper control arms, the upper end of the shock absorber being received at least in part in the channel defined by the upper arm, the first and third positions being forward of a central axis of the shock absorber, the second and fourth positions being rearward of the central axis of the shock absorber;
a sway bar having a left end and a right end,
the left end of the sway bar being connected to one of the lower and upper control arms of the left suspension assembly,
the right end of the sway bar being connected to one of the lower and upper control arms of the right suspension assembly,
the sway bar being pivotally connected to a wall defining at least one of the channels of the suspension support of the left suspension assembly at a position between the fourth position and the upper end of the shock absorber of the left suspension assembly,
the sway bar being pivotally connected to a wall defining at least one of the channels of the suspension support of the right suspension assembly at a position between the fourth position and the upper end of the shock absorber of the right suspension assembly;
a left wheel rotationally connected to the knuckle of the left suspension assembly; and
a right wheel rotationally connected to the knuckle of the right suspension assembly.

2. The vehicle of claim 1, wherein, for each of the left and right suspension assemblies, the lower end of the shock absorber is pivotally connected to the lower control arm.

3. The vehicle of claim 2, wherein, for each of the left and right suspension assemblies:
the upper control arm has an upper front member and an upper rear member;
the upper front member is connected to the upper rear member;
an inner end of the upper front member is pivotally connected to the lower front arm at the third position and is received at least in part in the channel defined by the lower front arm; and
an inner end for the upper rear member is pivotally connected to the lower rear arm at the fourth position and is received at least in part in the channel defined by the lower rear arm.

4. The vehicle of claim 3, wherein, for each of the left and right suspension assemblies:
the lower control arm has a lower front member and a lower rear member;
the lower front member is connected to the lower rear member;
an inner end of the lower front member is pivotally connected to the lower front arm at the first position and is received at least in part in the channel defined by the lower front arm; and
an inner end for the lower rear member is pivotally connected to the lower rear arm at the second position and is received at least in part in the channel defined by the lower rear arm.

5. The vehicle of claim 4, wherein, for each of the left and right suspension assemblies:
the lower front arm of the suspension support is forward of the central axis of the shock absorber; and
the lower rear arm of the suspension support is rearward of the central axis of the shock absorber.

6. The vehicle of claim 3, wherein, for each of the left and right suspension assemblies:
an outer end of the upper front member is pivotally connected to the knuckle at a position forward of the central axis of the shock absorber; and
an outer end for the upper rear member is pivotally connected to the knuckle at a position forward of the central axis of the shock absorber.

7. The vehicle of claim 3, wherein, for each of the left and right suspension assemblies:
the upper rear member has a first portion and a second portion;
the first portion of the upper rear member extends generally forwardly from the inner end of the upper rear member and is disposed laterally between the central axis of the shock absorber and the suspension support;

the second portion of the upper rear member extends generally laterally between the first portion of the upper rear member and an outer end of the upper rear member; and the second portion of the upper rear member is disposed forward of the central axis of the shock absorber.

8. The vehicle of claim 1, wherein:
the left end of the sway bar is connected to the lower control arm of the left suspension assembly; and
the right end of the sway bar is connected to the lower control arm of the right suspension assembly.

9. The vehicle of claim 8, further comprising:
a left link connecting the left end of the sway bar to the lower control arm of the left suspension assembly; and
a right link connecting the right end of the sway bar to the lower control arm of the right suspension assembly.

10. The vehicle of claim 9, wherein:
the upper control arm of the left suspension assembly has a portion disposed longitudinally between the left link and the central axis of the shock absorber of the left suspension assembly; and
the upper control arm of the right suspension assembly has a portion disposed longitudinally between the right link and the central axis of the shock absorber of the right suspension assembly.

11. The vehicle of claim 1, wherein, for each of the left and right suspension assemblies:
the inner end of the lower control arm is pivotally connected to the lower front arm and the lower rear arm about a first axis;
the inner end of the upper control arm is pivotally connected to the lower front arm and the lower rear arm about a second axis;
the upper end of the shock absorber is pivotally connected to the upper arm about a third axis;
the first axis is vertically lower than the second axis; and
the second axis is vertically lower than the third axis.

12. The vehicle of claim 11, wherein:
the sway bar is pivotally connected to the suspension supports of the left and right suspension assemblies about a fourth axis; and
for each of the left and right suspension assemblies, the fourth axis is vertically between the second and third axes.

13. The vehicle of claim 1, wherein each of the left and right suspension assemblies further comprises a pillow block connected to the suspension support;
wherein the sway bar is supported by the pillow blocks of the left and right suspension assemblies.

14. The vehicle of claim 13, wherein:
the left and right ends of the sway bar are disposed forward of the central axes of the shock absorbers of the left and right suspension assemblies; and
the pillow blocks of the left and right suspensions assemblies are disposed rearward of the central axes of the shock absorbers of the left and right suspension assemblies.

15. The vehicle of claim 1, wherein:
the left suspension assembly is a rear left suspension assembly;
the right suspension assembly is a rear right suspension assembly;
the left wheel is a rear left wheel; and
the right wheel is a rear right wheel;
the vehicle further comprising:
a front left suspension assembly connected to the frame;
a front right suspension assembly connected to the frame;
a front left wheel rotationally connected to the front left suspension assembly; and
a front right wheel rotationally connected to the front right suspension assembly.

16. The vehicle of claim 1, wherein the sway bar is pivotally connected to a rear side of each suspension support.

* * * * *